US008199080B2

(12) United States Patent
Okamoto et al.

(10) Patent No.: US 8,199,080 B2
(45) Date of Patent: Jun. 12, 2012

(54) DISPLAY DEVICE HAVING A PLURALITY OF DATA SIGNAL DRIVING MEANS AND METHOD FOR SAME

(75) Inventors: Eizo Okamoto, Kanagawa (JP); Koji Totoki, Kanagawa (JP)

(73) Assignee: Sony Corporation, Tokyo (JP)

( * ) Notice: Subject to any disclaimer, the term of this patent is extended or adjusted under 35 U.S.C. 154(b) by 986 days.

(21) Appl. No.: 12/183,127

(22) Filed: Jul. 31, 2008

(65) Prior Publication Data

US 2009/0033651 A1 Feb. 5, 2009

(30) Foreign Application Priority Data

Aug. 3, 2007 (JP) ................................ 2007-203531

(51) Int. Cl.
*G09G 3/30* (2006.01)
*G06F 3/038* (2006.01)

(52) U.S. Cl. ........................................ 345/77; 345/204

(58) Field of Classification Search ............... 345/76–83
See application file for complete search history.

(56) References Cited

U.S. PATENT DOCUMENTS

| | | | | |
|---|---|---|---|---|
| 6,380,919 | B1 * | 4/2002 | Koyama et al. | 345/92 |
| 7,652,645 | B2 * | 1/2010 | Park et al. | 345/76 |
| 7,920,109 | B2 * | 4/2011 | Chung | 345/82 |
| 7,944,414 | B2 * | 5/2011 | Shirasaki et al. | 345/77 |
| 2003/0193298 | A1 | 10/2003 | Okada et al. | |

FOREIGN PATENT DOCUMENTS

| | | |
|---|---|---|
| JP | 57-114189 | 7/1982 |
| JP | 2-25893 | 1/1990 |
| JP | 09-274451 | 10/1997 |
| JP | 10-253987 | 9/1998 |
| JP | 2000-029432 | 1/2000 |
| JP | 2003-058108 | 2/2003 |
| JP | 2003-280586 | 10/2003 |
| JP | 2006-084509 | 3/2006 |
| JP | 2006-235162 | 9/2006 |

OTHER PUBLICATIONS

Japanese Office Action issued on Jul. 28, 2009, for corresponding Japanese Patent Application JP 2007-203531.

* cited by examiner

*Primary Examiner* — Bipin Shalwala
*Assistant Examiner* — Steven Holton
(74) *Attorney, Agent, or Firm* — K&L Gates LLP

(57) ABSTRACT

A display device having frame display duration of X, including: emission elements corresponding to each pixel to be displayed, disposed on L lines, with the scanning direction as lines; a scanning driving unit scanning and driving the emission elements; M data signal driving units driving the emission elements to display an image; and a control unit supplying data signals corresponding to an image to the M data signal driving units, and controlling the scanning driving unit; wherein N is an integer satisfying 0≦N≦L/M−1, and a an integer satisfying 0<a≦M; the control unit supplies the data signal of the M×N+a'th line to the a'th data signal driving unit; and the scanning driving unit scans and drives the emission elements such that the M lines of the emission elements are driven simultaneously, the difference of driving start point-in-time of each line becomes X/L, and the emission duration of each line becomes M×X/L.

7 Claims, 14 Drawing Sheets

PRIOR ART

PRIOR ART

PRIOR ART

PRIOR ART

PRIOR ART

| FIG. 10A |
| --- |
| FIG. 10B |

DISPLAY DEVICE HAVING A PLURALITY OF DATA SIGNAL DRIVING MEANS AND METHOD FOR SAME

CROSS REFERENCES TO RELATED APPLICATIONS

The present application claims priority to Japanese Patent Application JP 2007-203531 filed in the Japanese Patent Office on Aug. 3, 2007, the entire contents of which are incorporated herein by reference.

BACKGROUND

The present application relates to a displays device and display method, and particularly, relates to a display device and display method suitable to be employed in the case of displaying an image using matrix driving.

A simple matrix (passive matrix) method is employed for driving emission elements such as LEDs (Light Emitting Diodes), liquid crystal elements, or the like which are provided on intersecting points by disposing X electrodes and Y electrodes in a grid pattern, and turning on/off these electrodes in accordance with a certain timing. With liquid crystal devices employing the simple matrix method, few electrodes are employed, manufacturing is facilitated, and accordingly, price is less inexpensive as compared to products employing the active matrix method. With a display panel employing the simple matrix method, the emission duration of one pixel at one frame of an image can be expressed as displays duration of one frame/number of scan lines.

Description will be made regarding a display device 1 employing an existing simple matrix method with reference to FIG. 1. The display device 1 is configured of a controller 11, display portion 12, data driver 13, and scan driver 14. In response to input of the image data corresponding to an image to be displayed on the display portion 12, the controller 11 controls the data driver 13 and scan driver 14.

With the display portion 12, wiring lines for connecting the outputs from the data driver 13 and scan driver 14 to electrodes included in an emission element 21 are wired around in a vertical and horizontal grid pattern. Image signal wiring lines connected to the output from the data driver 13 will be referred to as data wiring lines, and scan signal wiring lines connected to the output from the scan driver 14 will be referred to as scan wiring lines. Multiple emission elements 21 are provided on an intersection portion between a data wiring line and scan wiring line. The display portion 12 displays an image using emission of the emission element 21 driven bid the data driver 13 and scan driver 14.

That is to say, in a case wherein the display portion 12 is monochrome display, data wiring lines equivalent to the number of pixels arrayed in the horizontal direction at one frame are provided in a column manner (vertical direction in FIG. 1), and are connected to the output of the data driver 13. On the other hand, in a case wherein the display portion 12 is full-color display, there is a need to supply signals equivalent to three colors worth of R (Red), G (Green), and B (Blue) to each pixel, and accordingly, data wiring lines which are triple the number of pixels arrayed in the horizontal direction at one frame are provided in a column manner, and are connected to the output of the data driver 13. Also, even in a case wherein the display portion 12 is monochrome display or full-color displays, scan wiring lines equivalent to the number of horizontal lines of one frame are provided in a line manner (horizontal direction in FIG. 1), and are connected to the output of the scan driver 14.

With the display portion 12, the emission elements 21 equivalent to the number of pixels are provided in the case of monochrome display, and the emission elements 21 which are triple the number of pixels are provided in the case of full-color display, and each of the emission elements 21 includes a data electrode connected to the output of the data driver 13, and a scan electrode connected to the output of the scan driver 14.

With the display device 1 employing the simple matrix method, LEDs (Light Emitting Diodes) can be employed as the emission elements 21. Also, an arrangement may be made wherein with the display device 1, liquid crystal is employed as the emission elements 21, and a display method such as the STN (Super Twisted Nematic) method, DSTN (Dual-scan Super Twisted Nematic) method, or the like, which are the simple matrix methods, is employed.

In a case wherein each of the emission elements 21 of the display portion 12 is distinguished, each will be referred to as "emission element 21-*n*-*m*", wherein its line is n, and its column is m. Specifically, in FIG. 1, the emission elements 21 provided on the top line of the display portion 122 are referred to as an emission element 21-1-1, emission element 21-1-2, and soon. Similarly, the emission elements 21 provided on the next line are referred to as an emission element 21-2-1, emission element 21-2-2, and so on, and the emission elements 21 further provided on the next line are referred to as an emission element 21-3-1, emission element 21-3-2, and so on. In a case wherein each of the emission elements 21 of the display portion 12 is not distinguished, each will be referred to simply as "emission element 21".

The data driver 13 obtains one line worth of data signals indicating information to be displayed on the display portion 12 at a time, latches (holds) one line worth of the data signals corresponding to the respective pixels internally, performs PWM (Pulse Width Modulation) control based on the latched data signals, converts the data signals into the corresponding current values, and applies electric charge to the data electrode of the emission elements 21 at predetermined timing. Description will be made later regarding the detailed configuration of the data driver 13 with reference to FIG. 2.

The scan driver 14 is configured of shift registers equivalent to the number of horizontal lines, and receives supply of a scan start pulse having the same pulse width as the scan clock at the top of each frame from the controller 11. The pulse Width (one cycle of ON/OFF) of the scan clock is equal to display duration of one frame/number of scan lines.

With the respective shift registers of the scan driver 14, the supplied scan start pulse is shifted from the shift register corresponding to the first line to the shift register corresponding to the lower line thereof in order based on the scan clock. Thus, a switching element (e.g., switching transistor) connected to the shift register which receives the ON signal of the scan start pulse is turned to ON, the corresponding line is scanned, and the pixels of the relevant line are lit corresponding to the data signal.

The scan electrodes of the emission elements 21 disposed in a matrix manner at the display portion 12 are common for each line, and while the switching element connected to the scan wiring is ON, the emission elements 21 of the line thereof are lit based on the current value supplied from the data driver 13. ON/OFF action of the scan driver 14 and emission timing for each line will be described later with reference to FIGS. 3 and 4.

FIG. 2 illustrates the further detailed configuration of the data driver 13. There are provided shift registers 41-1 through 41-*a*, latches 42-1 through 42-*a*, comparators 43-1 through 43-*a*, and drivers 44-1 through 44-*a*, which are equivalent to the number of data wiring lines (the number of data wiring lines wired from the data driver 13 is taken as a, here), which are equivalent to the number of pixels arrayed in the horizontal direction at one frame, or triple the number of pixels, and a counter 45 for counting the number of clocks employed for PWM control by the comparators 43-1 through 43-*a*.

Hereafter, in a case wherein the shift registers 41-1 through 41-*a* are not individually distinguished, each will be referred to simply as "shift register 41", and in a case wherein the latches 42-1 through 42-*a* are not individually distinguished, each will be referred to simply as "latch 42". Similarly, in a case wherein the comparators 43-1 through 43-*a* are not individually distinguished, each will be referred to simply as "comparator 43", and in a case wherein the drivers 44-1 through 44-*a* are not individually distinguished, each will be referred to simply as "driver 44".

The shift register 41-1 shifts the image data signal supplied from the controller 11 to the shift register 41-2. The subsequent shift registers of the shift register 41-2 and thereafter similarly supply the image data signal to the next shift register. When image data signals on a certain line, i.e., the signals corresponding to emission intensity of the frame including a pixels of one line, or a sub pixels corresponding to each of RGB making up a pixel, are all transmitted to the shift registers 41-1 through 41-*a*, the shift registers 41-1 through 41-*a* supply the signals thereof to the latches 42-1 through 42-*a* to store (latch) these. Now, sub pixels indicate elements making up a pixel, and at the time of monochrome display, the number of sub pixels is equal to the number of pixels, and at the time of color display, the number of sub pixels is triple the number of pixels.

In response to supply of a data latch clock, the latches 42-1 through 42-*a* supply the stored data signal to the comparators 43-1 through 43-*a* at predetermined timing simultaneously.

The comparator 43 controls the driver 44 which drives the emission elements 21 using PWM (Pulse Width Modulation) control. That is to say, the comparator 43 controls the emission period of the emission elements 21 by controlling duration wherein the driver 44 is ON within a predetermined period (PWM cycle) based on the data signal supplied from the latch 42. The driver 44 drives the emission elements 21 based on the control of the comparator 43. Also, while the emission elements 21 are driven by the comparator 43 and driver 44, the shift register 41 and latch 42 perform transmission and latching of the data of the next line.

Next, description will be made regarding emission timing control of the emission elements 21 and transmission of data with reference to FIGS. 3 through 5.

FIG. 3 illustrates the scan start pulse, scan clock, and the emission timing of each line. The scan clock is a clock for controlling the emission start timing of each line, and in a case wherein the emission duration of each line is T, i.e., in the case of

*T*=display duration of one frame/number of scan lines, the emission start timing of each line is also shifted by *T*.

When receiving supply of the scan start pulse at the top of each frame from the controller 11, the scan driver 14 counts the scan clock, light-emits the first line by the duration T from point-in-time $t_1$ to point-in-time $t_2$, following which light-emits the second line by the duration T from point-in-time $t_2$ to point-in-time $t_3$, and hereafter, similarly, light-emits the b'th line (b is a positive integer which is equal to or greater than 3 and equal to or less than the number of lines of one frame) by the duration T from point-in-time $t_b$ to point-in-time $t_{(b+1)}$.

Description will be made with reference to FIG. 4 regarding the operation of the scan driver 14 for light-emitting each line the timing described with reference to FIG. 3.

The scan driver 14 is configured of shift registers 61-1 through 61-*c* (c is the number of horizontal lines making up one frame), and switching transistors 62-1 through 62-*c* corresponding to the respective shift registers thereof. When the scan start pulse is supplied to the shift transistor 61-1, the scan start pulse is supplied to the shift register 61-1, the corresponding switching transistor 62-1 is turned ON, and voltage is applied to the respective scan electrodes of the emission elements 21 on the first line. Subsequently, based on the output from the data driver 13 at that time, each of the emission elements 21 on the first line is lit for predetermined duration.

That is to say, as described with reference to FIG. 2, in a case wherein image data signals corresponding to one line are sequentially supplied to the data driver 13, and the data driver 13 can latch only one line worth of image data signals at a time, duration necessary for transmitting one line worth of data signals of image data from the controller 11 to the data driver 13 needs to be equal to or less than T.

Subsequently, after elapse of the duration T from the emission start of the first line, the shift register 61-1 shifts the ON signal corresponding to the scan start pulse to the shift register 61-2. The scan start pulse is an ON signal having the width equivalent to one cycle of the scan clock, so the shift register 61-1 shifts the ON signal (High) corresponding to the scan start pulse to the shift register 61-2, following which receives supply of an OFF signal (Low). Accordingly, at this time, the switching transistor 62-1 is turned OFF. In response to the ON signal corresponding to the scan start pulse, the shift register 61-2 turns on the switching transistor 62-2, thereby applying voltage to the scan electrode of each of the emission elements 21 on the second line. Subsequently, based on the output from the data driver 13 at that time, each of the emission elements 21 is lit for predetermined duration.

Subsequently, after elapse of the duration T from the emission start of each line, the emission of the line thereof is completed in order to start emission for the next line, and the ON signal corresponding to the scan start pulse is shifted to the shift registers 61-3 through 61-*c*.

Data transmission to the data driver 13, and the emission timing of each line will be described with reference to FIG. 5. The image data signal on the k'th line (k is a positive integer which is equal to or greater than 1 and also equal to or smaller than the number of lines c making up one frame) is supplied from the controller 11 to the data driver 13. As described above, in a case wherein the emission duration of each line is T, duration necessary for data transmission of one line needs to be equal to or smaller than T. Subsequently, data transmission and latching of the image data signal on the k'th line ends, and at point-in-time $t_{(k+1)}$ after elapse of the duration T from the transmission start point-in-time $t_k$ of the image data signal on the k'th line, the k'th line is lit, and supply of the image data signal on the k+1'th line is started. Subsequently, data transmission and latching of the image data signal on the k+1'th line ends, and at point-in-time $t_{(k+2)}$ after elapse of the duration T from the transmission start point-in-time $t_{(k+1)}$ of the image data signal on the k+1'th line, the k+1'th line is lit, and supply of the image data signal on the k+2'th line is started. Subsequently, data transmission and latching of the image data signal on the k+2'th line ends, and at point-in-time $t_{(k+3)}$ after elapse of the duration T from the transmission start point-in-time $t_{(k+2)}$ of the image data signal on the k+2'th line, the k+2'th line is lit, and supply of the image data signal on the k+3'th line is started. Hereafter, similarly, while a certain line is lit up to the last line of the frame thereof, the image data signal on the next line is supplied.

In FIG. 5, with that the emission cycle of each line as fH, the transmission cycle of data and the horizontal frequency of the display of the display portion 12 also become fH, and with the number of pixels of one horizontal line as a, and the number of gradations at the emission of each pixel as D, an emission clock frequency fp is represented with fp=fH×D, and a data transmission clock frequency fd is represented with fd=fH×a.

Specific description of the overall operation of the display device 1 described above will be as follows.

First, the image data on the first line is transmitted to the shift register 41 of the data driver 13 from the controller 11, and is latched at the latch 42. Subsequently, in response to supply of the scan start pulse, the scan driver 14 turns on the first column of the display portion 12, i.e., the switching transistor 62-1 connected to the scan electrodes of the column of the emission element 21-1-1, emission element 21-1-2, and so on by the period of display duration of one frame/number of scan lines=duration *T*.

Subsequently, at that time, the first column of the display portion 12, i.e., the emission element 21-1-1, emission element 21-1-2, and so on are lit with the brightness corresponding to the ON duty of the driver 44 controlled by each comparator 43 of the data driver 13. While emission of the first column of the display portion 12 is performed, the image data on the second line is transmitted to the shift register 41 of the data driver 13, and is latched at the latch 42.

Subsequently, at the next timing thereof the scan driver 14 turns on the second column of the display portion 12, i.e., the switching transistor 62-2 connected to the scan electrodes of the column of the emission element 21-2-1, emission element 21-2-2, and so on during the period of the duration T. Subsequently, at that time, the second column of the display portion 12, i.e., the emission element 21-2-1, emission element 21-2-2, and so on are lit with the brightness corresponding to the ON duty of the driver 44 controlled by each comparator 43 of the data driver 13. While emission of the second column of the display portion 12 is performed, the image data on the third line is transmitted to the shift register 41 of the data driver 13, and is latched at the latch 42.

Hereafter, similarly, the switching transistor 62 connected to the scan electrodes on the k'th column is turned on during the period of the duration T, and at that time, the k'th column of the display portion 12 is lit with the brightness corresponding to the ON duty of the driver 44 controlled by each comparator 43 of the data driver 13. Subsequently, while emission of the k'th column of the display portion 12 is performed, the image data on the k+1'th line is transmitted to the shift register 41 of the data driver 13, and is latched at the latch 42. Subsequently, such processing is repeated one line at a time, thereby displaying the image data of one frame.

With the simple matrix method described with reference to FIGS. 1 through 5, the configuration is simple, so the panel can be manufactured inexpensively, but as described above, the emission duration of one pixel at one frame of an image is display duration of one frame/number of scan lines, and accordingly, sufficient brightness may not be able to be obtained. Accordingly, with the flat display field, not the simple matrix method but the active matrix method, such as TFT (Thin Film Transistor), has been frequently employed.

With the active matrix method, signal input is performed as to only the line being scanned, but a TFT is provided for each emission element of each of RGB included in one pixel, whereby applied voltage can be maintained even during a non-scan period. That is to say, the active matrix method is a hold-type driving display method whereby each of the sub pixels can maintain constant brightness up to the next scanning.

Heretofore, of display devices performing matrix driving, in order to perform halftone display, some display devices are configured to apply a scanning signal to multiple line electrodes simultaneously in a duplicated manner (see Japanese Unexamined Patent Application Publication No. 2-25893).

Also, some display devices are configured to obtain sufficient brightness even using the simple matrix method by dividing a displays portion into two in the horizontal direction, providing driving drivers of the data electrodes of two regions separately, and light-emitting each of the two regions one line at a time at the same timing, i.e., by light-emitting two lines on one screen simultaneously (see Japanese Patent Application No. 2003-280586).

SUMMARY

Due to improvement in broadcasting, communication, information technology, and so forth, currently, there is a trend toward increasingly more information amount of pictures and images increases increasingly, and accordingly there is great demand for improvement in resolution (number of pixels) is great regarding display devices. For example, with televisions, a specification with display performance of 1920×1080 which is referred to as FHD (Full High Definition) is becoming standard as compared to existing 640 (or 854)×480 pixels which is referred to as SD (Standard Definition). For example, with an existing liquid crystal display device or the like, in the case of realizing FHD resolution with color display, there is a need to provide 5760 data wiring lines, and 1080 scan wiring lines.

With the active matrix method, each sub pixel is lit during almost all of the duration wherein one frame worth of image is displayed, thereby obtaining high brightness. On the other hand, the manufacturing process for forming TFT is complicated, and accordingly, manufacturing cost increases, and moving image blurring due to holding type driving occurs.

On the other hand, the simple matrix method is a method similar to impulse driving represented by CRT which is contrary to holding type driving, whereby manufacturing cost can be suppressed since there is no need to form TFTs, which provides an advantage wherein moving image blurring is not readily caused. Note however, as described above, only the line being scanned is lit, which causes resolution in the vertical direction to increase, but in reverse proportion to this, causes brightness to decrease.

Accordingly, heretofore, the simple matrix method has not been frequently employed for displays which require resolution and brightness. Note however, with the simple matrix method, if brightness can be increased, there can be utilized the advantage in that manufacturing cost is low, and image blurring does not readily occur.

With the simple matrix method, driving LEDs as pixels causes problems relating to response speed and brightness. In order to increase the brightness of an LED, there is a need to increase the driving current value thereof, or prolong the emission duration thereof.

Note however, that increasing the driving current value of an LED causes the life of the LED to be shortened. Alternatively, prolonging the emission duration of an LED causes poor responsivity. For example, if the technique according to Japanese Unexamined Patent Application Publication No. 2-25893 is employed, halftone can be displayed, but the brightness of each pixel cannot be increased. Also, for example, if the technique according to Japanese Unexamined Patent Application Publication No. 2003-280586 is employed, two lines are lit at one screen simultaneously, so the brightness of the entire screen increases, but if the emission duration of each line is the same as that in the related art, the brightness of each pixel does not increase, and if the emission duration of each line is prolonged, poor responsiveness is effected.

It has been recognized that there is a need to prolong the emission duration of each pixel, and improve brightness without increasing the driving current value, and impairing responsiveness.

A display device according to an embodiment is a display device of which the display duration of one frame is X, comprising: emission elements corresponding to each pixel to be displayed, disposed on L lines, with the scanning direction as lines; a scanning driving unit configured to scan and drive the emission elements; M data signal driving units configured to drive the emission elements scanned and driven by the scanning driving unit to display a predetermined image; and a control unit configured to supply a data signal corresponding to a predetermined image to the M data signal driving units, and control the scanning driving unit; with N being assumed to be an integer satisfying $0 \leqq N \leqq L/M-1$, and a being assumed to be an integer satisfying $0 < a \leqq M$; with the control unit supplying the data signal of the $M \times N+a$'th line to the a'th data signal driving unit; and with the scanning driving unit scanning and driving the emission elements such that the M lines of the emission elements are driven simultaneously, the difference of driving start point-in-time of each consecutive line becomes X/L, and the consecutive emission duration of each line becomes $M \times X/L$.

The control unit may apply a scan start signal of which the ON time is $M \times X/L$ to the scanning driving unit; with the scanning driving unit including L shift registers and L switching units, which each correspond to each line of the L lines; with the shift registers shifting the scan start signal from the top line to the bottom line of the L lines per one screen; and with the switching units performing switching of a driving signal so as to scan and drive the corresponding line, when the corresponding shift register of the shift registers holds an ON signal.

The emission elements may be configured of an LED.

A display method according to an embodiment is a display method for a display device of which the display duration of one frame is X, the display device including emission elements corresponding to each pixel to be displayed, disposed on L lines, with the scanning direction as lines, a scanning driving unit configured to scan and drive the emission elements, M data signal driving units configured to drive the emission elements scanned and driven by the scanning driving unit to display a predetermined image, and a control unit configured to supply a data signal corresponding to a predetermined image to the M data signal driving units, and control the scanning driving unit, the display method comprising the steps of: assuming that N is an integer satisfying $0 \leqq N \leqq L/M-1$, and a is an integer satisfying $0 < a \leqq M$; causing the control unit to supply the data signal of the $M \times N+a$'th line to the a'th data signal driving unit; causing the scanning driving unit to scan and drive the emission elements such that the M lines of the emission elements are driven simultaneously, the difference of driving start point-in-time of each consecutive line becomes X/L, and the consecutive emission duration of each line becomes $M \times X/L$; and causing the M data signal driving units to drive the emission elements scanned and driven by the scanning driving unit to display a predetermined image.

According to an embodiment, with N as an integer satisfying $0 \leqq N \leqq L/M-1$, and a as an integer satisfying $0 < a \leqq M$, the data signal of the $M \times N+a$'th line is supplied to the a'th data signal driving unit, and the emission elements are scanned and driven such that the M lines of the emission elements are driven simultaneously, the difference of driving start point-in-time of each consecutive line becomes X/L, and the consecutive emission duration of each line becomes $M \times X/L$.

The display device may be an independent device, or may be a block for performing display processing in a television receiver or information processing device.

As described above, according to an embodiment, an image can be displaced, and particularly, the emission duration of each pixel can be prolonged, and brightness can be improved without increasing the driving current value, and impairing responsiveness.

Additional features and advantages are described herein, and will be apparent from the following Detailed Description and the figures.

DETAILED DESCRIPTION

Figure 1:
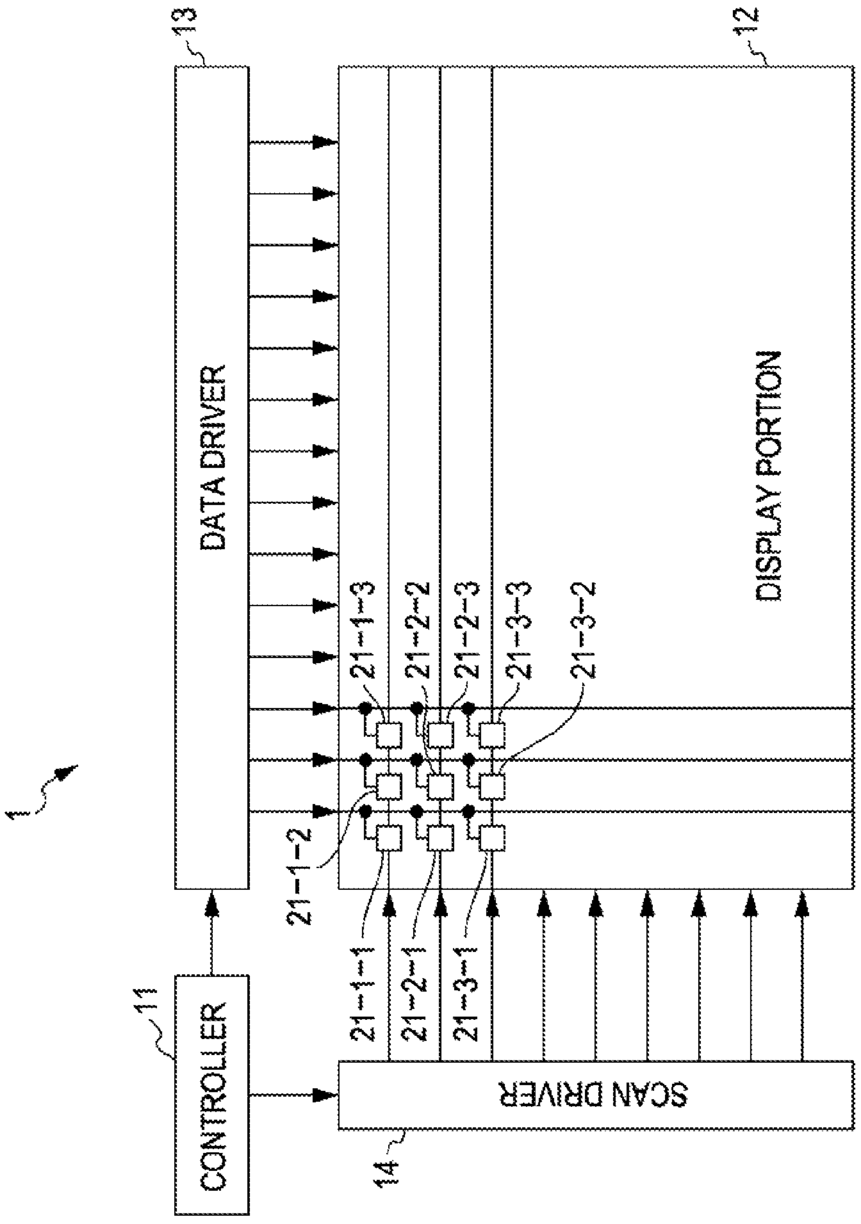
FIG. 1 is a diagram illustrating the configuration of an existing display device.

A detailed description following with reference to the figures according to an embodiment.

A display device according to an embodiment is a display device of which the display duration of one frame is X, comprising: emission elements (e.g., emission elements 21 shown in FIG. 6) corresponding to each pixel to be displayed, disposed on L lines, with the scanning direction as lines; a scanning driving unit (e.g., scan driver 126 shown in FIG. 6) configured to scan and drive the emission elements; M data signal driving units (e.g., #1 data driver 123, #2 data driver 124, and #3 data driver 125 shown in FIG. 6) configured to drive the emission elements scanned and driven by the scanning driving unit to display a predetermined image; and a control unit (e.g., controller 121 shown in FIG. 6) configured to supply a data signal corresponding to a predetermined image to the M data signal driving units, and control the scanning driving unit; with N being assumed to be an integer satisfying $0 \leqq N \leqq L/M-1$, and a being assumed to be an integer satisfying $0<a \leqq M$; with the control unit supplying the data signal of the M×N+a'th line to the a'th data signal driving unit; and with the scanning driving unit scanning and driving the emission elements such that the M lines of the emission elements are driven simultaneously, the difference of driving start point-in-time of each consecutive line becomes X/L, and the consecutive emission duration of each line becomes M×X/L.

Figure 6:
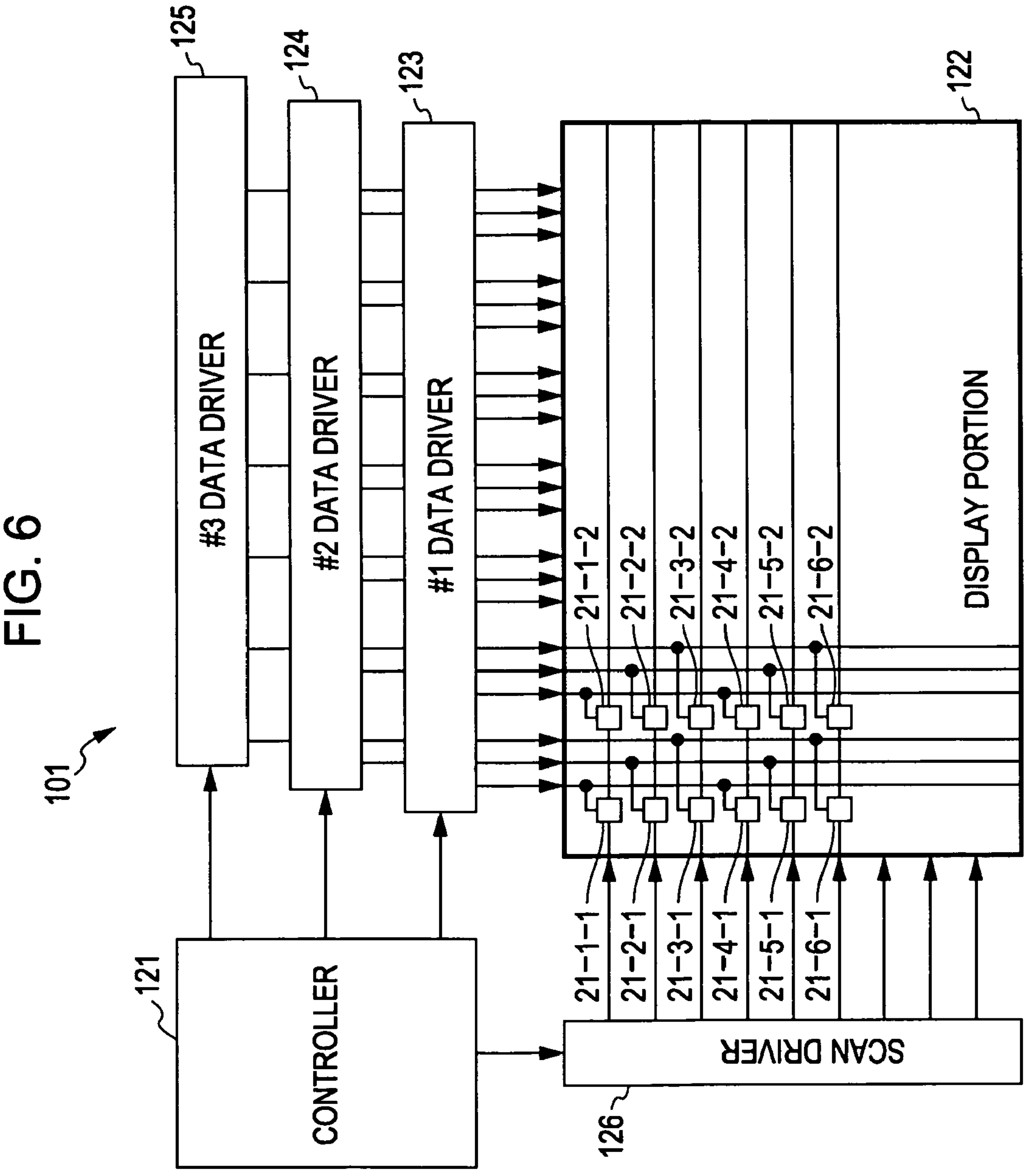
FIG. 6 is a diagram illustrating the configuration of a display device according to which an embodiment has been applied.
Figure 12:
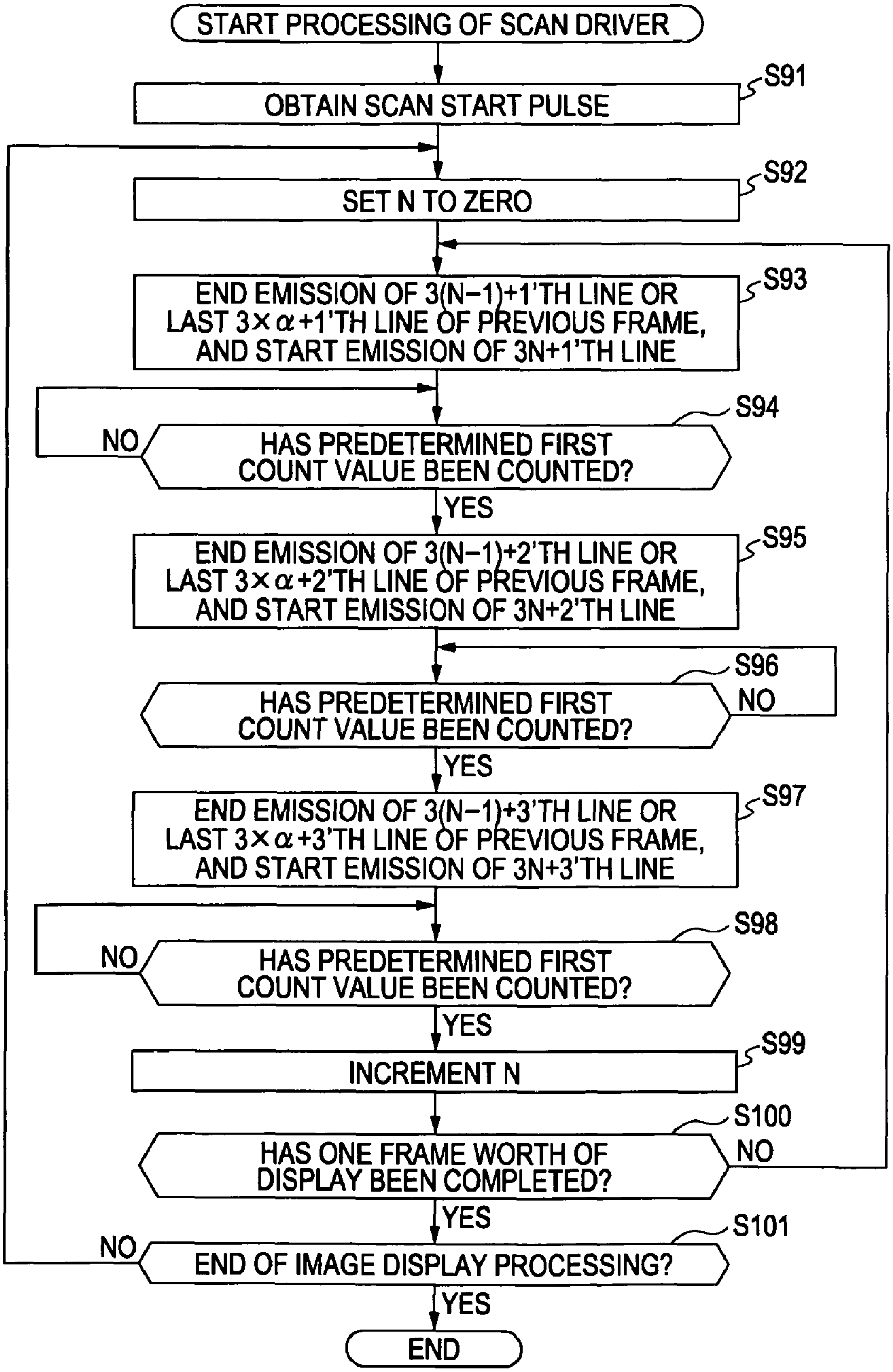
FIG. 12 is a flowchart for describing the processing of the scan driver.
Figure 13:
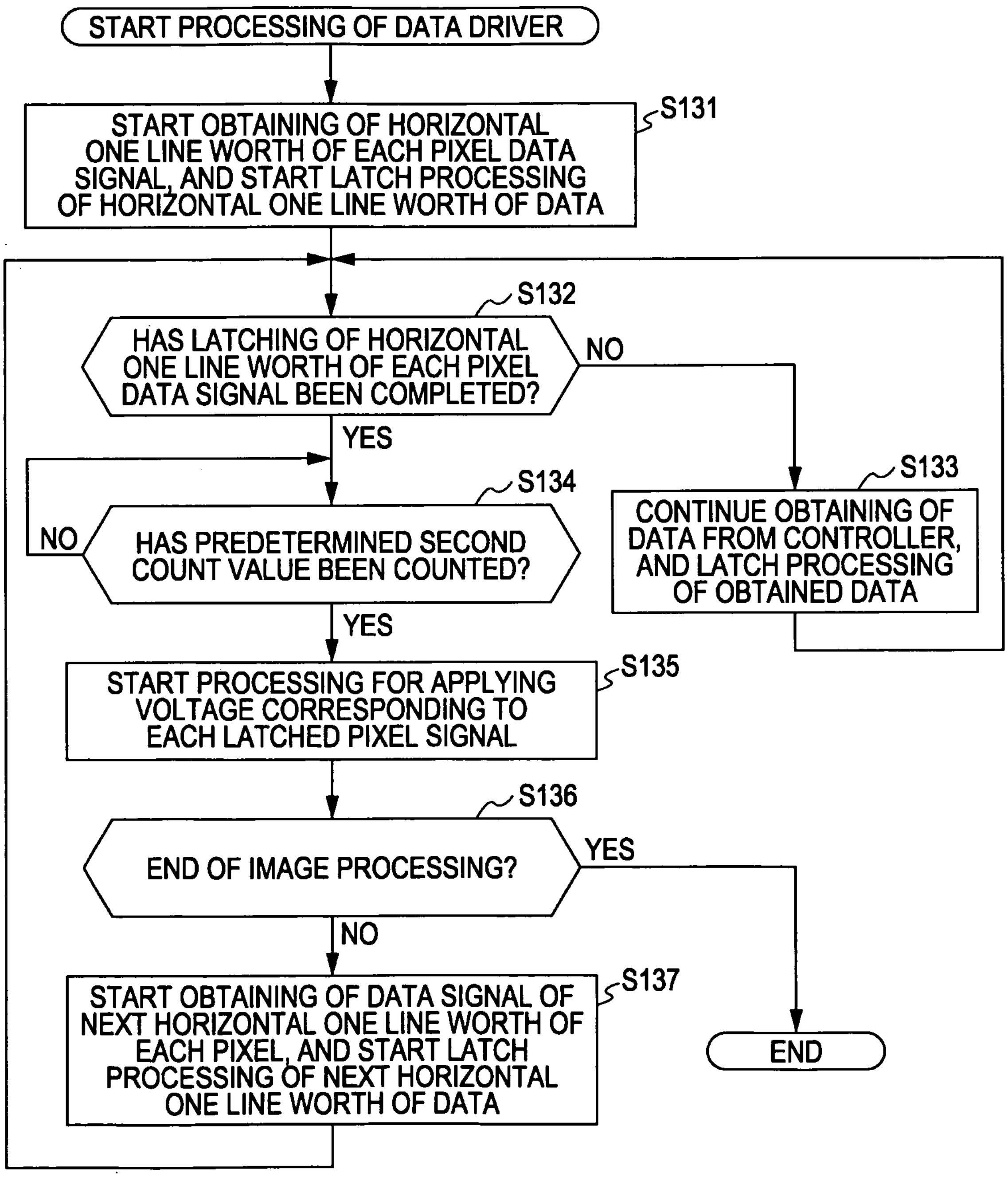
FIG. 13 is a flowchart for describing the processing of the data driver.

A display method according to an embodiment is a display method for a display device of which the display duration of one frame is X, the display device including emission elements (e.g., emission elements 21 shown in FIG. 6) corresponding to each pixel to be displayed, disposed on L lines, with the scanning direction as lines, a scanning driving unit (e.g., scan driver 126 shown in FIG. 6) configured to scan and drive the emission elements, M data signal driving units (e.g., #1 data driver 123, #2 data driver 124, and #3 data driver 125 shown in FIG. 6) configured to drive the emission elements scanned and driven by the scanning driving unit to display a predetermined image, and a control unit (e.g., controller 121 shown in FIG. 6) configured to supply a data signal corresponding to a predetermined image to the M data signal driving units, and control the scanning driving unit, the display method comprising the steps of: assuming that N is an integer satisfying $0 \leqq N \leqq L/M-1$, and a is an integer satisfying $0<a \leqq M$; causing the control unit to supply the data signal of the M×N+a'th line to the a'th data signal driving unit (e.g., processing in steps S53, S55, and S57 shown in FIG. 11); causing the scanning driving unit to scan and drive the emission elements such that the M lines of the emission elements are driven simultaneously, the difference of driving start point-in-time of each consecutive line becomes X/L, and the consecutive emission duration of each line becomes M×X/L (e.g., processing described with reference to FIG. 12); and causing the M data signal driving units to drive the emission elements scanned and driven by the scanning driving unit to display a predetermined image (e.g., processing described with reference to FIG. 13).

Description will be made below regarding embodiments with reference to the drawings.

Description will be made with reference to FIG. 6 regarding a display device 101 to which an embodiment has been applied. The displays device 101 is configured of a controller 121, display portion 122, #1 data driver 123, #2 data driver 124, #3 data driver 125, and scan driver 126.

In response to input of image data corresponding to an image to be displayed on the display portion 122, the controller 121 divides the image data in increments of horizontal line to supply the divided image data to the #1 data driver 123, #2 data driver 124, and #3 data driver 125, respectively. Also, the controller 121 controls the #1 data driver 123, #2 data driver 124, #3 data driver 125, and scan driver 126.

Specifically, the controller 121 supplies an image data signal corresponding to the 3N+1'th line (where N is an integer; $0 \leqq N \leqq \{(\text{number of scan lines}-1)/3\}$) of one frame to the #1 data driver 123, supplies an image data signal corresponding to the 3N+2'th line to the #2 data driver 124, and supplies an image data signal corresponding to the 3N+3'th line to the #3 data driver 125. Also, the controller 121 supplies a scan start pulse to the scan driver 126 with pulse width which is triple a scan clock. The pulse width (one cycle of ON/OFF) of the scan clock is equal to display duration of one frame/number of scan lines.

With the display portion 122, the data wiring lines in the vertical direction in the drawing from the #1 data driver 123, #2 data driver 124, and #3 data driver 125, and the scan wiring lines in the horizontal direction in the drawing from the scan driver 126 are wired around in a vertical and horizontal grid pattern. Multiple emission elements 21 are provided at an intersection portion between a data wiring line and scan wiring line. The display portion 122 displays an image using emission of the emission element 21 driven by the #1 data driver 123, #2 data driver 124, #3 data driver 125, and scan driver 126.

Let us say that with the display device 101, the emission elements 21 provided at the display device 122 are configured of LEDs. In the case of employing LEDs as the emission elements 21, consumption power can be reduced as compared to the case of employing liquid crystal display elements.

For example, in the case of the display portion 122 being monochrome display, the number of data wiring lines from each of the #1 data driver 123, #2 data driver 124, and #3 data driver 125 is equal to the number of pixels arrayed in the horizontal direction of one frame. Accordingly, with the display portion 122, the data wiring lines which are triple the number of pixels, arrayed in the horizontal direction of one frame, are provided in a column manner (vertical direction in FIG. 6).

Also, in the case of the display portion being full-color display, the number of data wiring lines from each of the #1 data driver 123, #2 data driver 124, and #3 data driver 125 is triple the number of pixels arrayed in the horizontal direction at one frame. That is to say, with the display portion 122, data wiring lines of which the number is further ninefold (triple× triple) the number of pixels arrayed in the horizontal direction at one frame are provided in a column manner (vertical direction in FIG. 6).

Also, even in a case wherein the display portion 12 is monochrome display or full-color display, scan wiring lines equivalent to the number of horizontal lines are provided in a line manner (horizontal direction in FIG. 6), and are connected to the output of the scan driver 126.

With the display portion 122, the emission elements 21 equivalent to the number of pixels are provided in the case of monochrome display, and the emission elements 21 triple the number of pixels are provided in the case of full-color display. Each of the emission elements 21 has an electrode connected to one of the #1 data driver 123, #2 data driver 124, and #3 data driver 125, and an electrode connected to the output of the scan driver 126.

For example, each of the emission elements 21 of the display portion 122 is distinguished with lines being represented by n, and columns being represented by m, i.e., by emission element 21-*n*-*m*. Specifically, in FIG. 6, the emission elements 21 provided on the top line in the drawing of the display portion 122 are represented as an emission element 21-1-1, emission element 21-1-2, and so on, the emission elements 21 provided on the next line are represented as an emission element 21-2-1, emission element 21-2-2, and so on, and the emission elements 21 provided on the further next line are represented as an emission element 21-3-1, emission element 21-3-2, and so on. Further, with the display portion 122, the emission elements 21 of n=1, 4, 7, 10, and so on are connected to the #1 data driver 123, the emission elements 21 of n=2, 5, 8, 11, and so on are connected to the #2 data driver 124, and the emission elements 21 of n=3, 6, 9, 12, and so on are connected to the #3 data driver 125.

Figure 2:
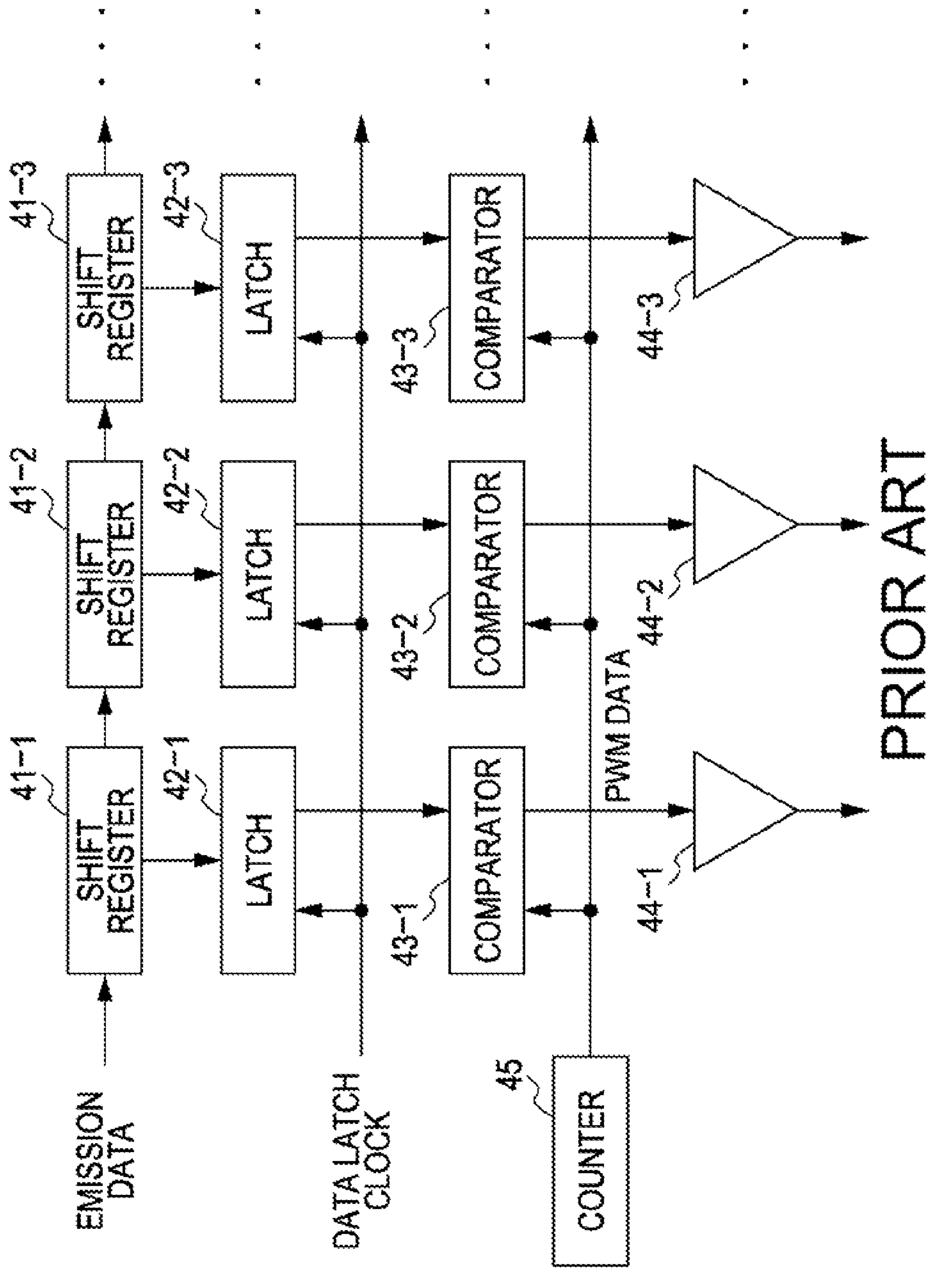
FIG. 2 is a block diagram illustrating a part of the configuration of the data driver shown in FIG. 1.

The #1 data driver 123 has basically the same configuration as the existing data driver 13 described with reference to FIG. 2, receives supply of an image data signal corresponding to the 3N+1'th line of one frame, and supplies the current value corresponding to the image data to the emission elements 21 of n=1, 4, 7, 10, and so on at predetermined timing using PWM control.

The #2 data driver 124 has basically the same configuration as the existing data driver 13 described with reference to FIG. 2, receives supply of an image data signal corresponding to the 3N+2'th line of one frame, and supplies the current value corresponding to the image data to the emission elements 21 of n=2, 5, 8, 11, and so on at predetermined timing using PWM control.

The #3 data driver 125 has basically the same configuration as the existing data driver 13 described with reference to FIG. 2, receives supply of an image data signal corresponding to the 3N+3'th line of one frame, and supplies the current value corresponding to the image data to the emission elements 21 of n=3, 6, 9, 12, and so on at predetermined timing using PWM control.

The scan driver 126 is, similar to the existing scan driver 14, configured of the shift registers 61-1 through 61-*c*, and switching transistors 62-1 through 62-*c*, which are equivalent to the number of horizontal lines. The scan driver 126 receives supply of the scan start pulse at the top of each frame from the controller 121, and applies predetermined electric charge to the scan electrodes of the emission elements 21 three lines at a time at predetermined timing.

That is to say, with the display device 101, three lines worth of the emission elements 21 of the display portion 122 are lit simultaneously. The scan driver 126 light-emits and drives three lines worth of the emission elements 21 at one time, but basically, the emission start timing of each line is shifted by display duration of one frame/number of scan lines=duration *T*, and the one-time emission duration of each line is {(display duration of one frame/number of scan lines)×3}=duration 3*T*.

The scan start pulse of which the pulse width is triple that of the scan clock is supplied to the scan driver 126 from the controller 121. With the scan driver 126, the ON signal of the scan start pulse is supplied to the shift register 61-1, the switching transistor 62-1 is turned on, and the emission elements 21 on the first line are lit based on the output from the #1 data driver 123 at that time.

Subsequently, after elapse of the duration T from the emission start of the first line, the shift register 61-1 supplies the ON signal corresponding to the scan start pulse to the shift register 61-2 based on the scan clock. At this time, the scan start pulse supplied to the shift register 61-1 is still high (ON), so the switching transistor 62-1 is also still ON. Subsequently, the shift transistor 61-2 to which the ON signal is shifted turns on the switching transistor 62-2. Accordingly, the emission elements 21 on the first line are lit based on the output from the #1 data driver 123 at that time, and the emission elements 21 on the second line are lit based on the output from the #2 data driver 124 at that time.

Subsequently, after elapse of the duration T from the emission start of the second line, the shift register 61-1 supplies the ON signal corresponding to the scan start pulse to the shift register 61-2, and the shift transistor 61-2 supplies the ON signal corresponding to the scan start pulse to the shift transistor 61-3. At this time, the scan start pulses supplied to the shift registers 61-1 and 61-2 are still high (ON), so the switching transistors 62-1 and 62-2 are also still ON. Subsequently, the shift transistor 61-3 to which the ON signal is shifted turns on the switching transistor 62-3. Accordingly, the emission elements 21 on the first line are lit based on the output from the #1 data driver 123 at that time, the emission elements 21 on the second line are lit based on the output from the #2 data driver 124 at that time, and the emission elements 21 on the third line are lit based on the output from the #3 data driver 125 at that time.

Figure 7:
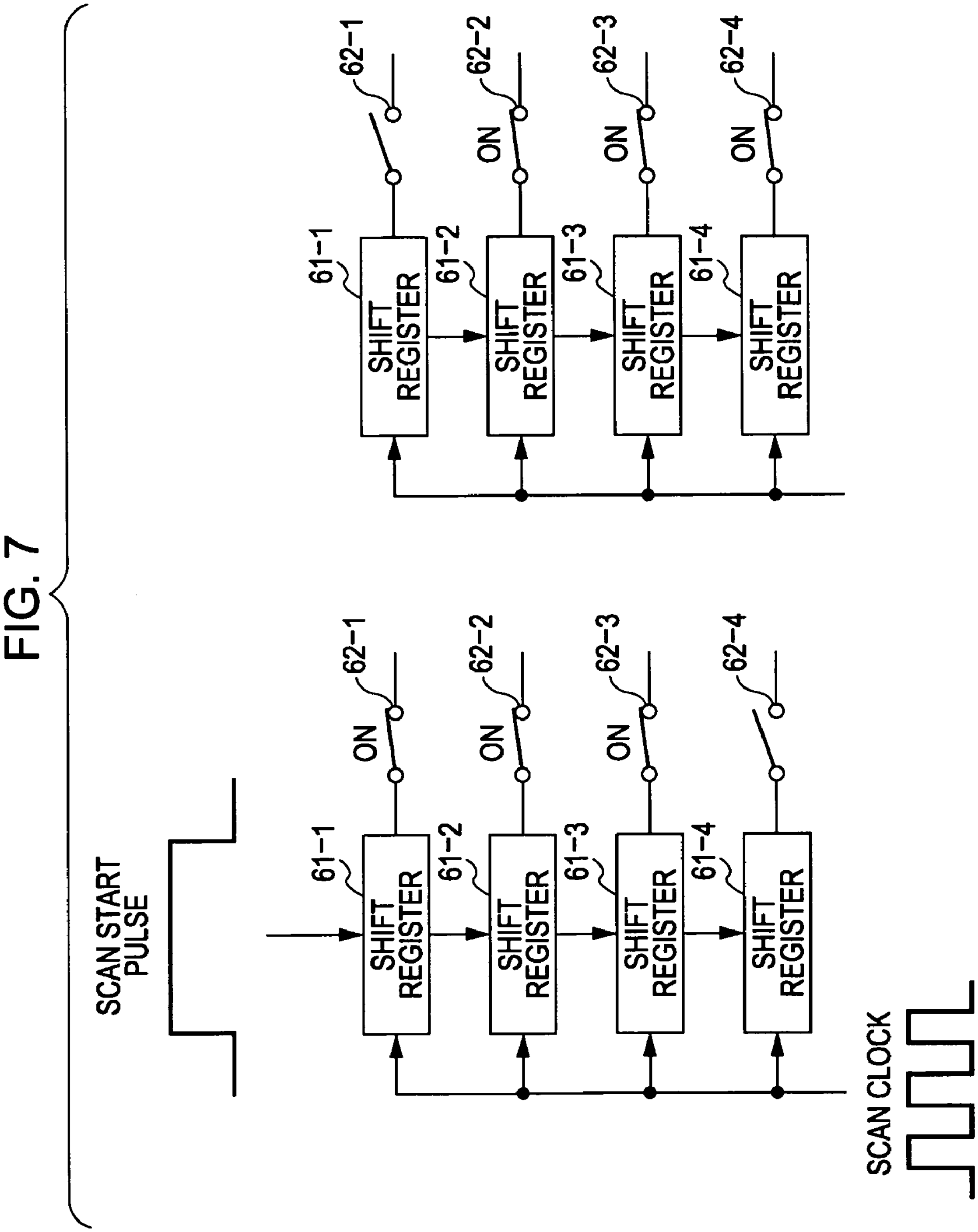
FIG. 7 is a diagram for describing the operation of the scan driver shown in FIG. 6.

Subsequently, as shown in FIG. 7, in a state in which three of the shift registers 61-1 through 61-3 are ON, in other words, after elapse of the duration T from a state in which the first through third lines are lit, the shift register 61-1 supplies the ON signal corresponding to the scan start pulse to the shift register 61-2, the shift register 61-2 supplies the ON signal corresponding to the scan start pulse to the shift register 61-3, and further, the shift register 61-3 supplies the ON signal corresponding to the scan start pulse to the shift register 61-4. Subsequently, the shift register 61-4 to which the ON signal is shifted turns on the switching transistor 62-4. At this time, the scan start pulses supplied to the shift registers 61-2 and 61-3 are still high (ON), so the switching transistors 62-2 and 62-3 are also still ON, but the scan start pulse supplied to the shift register 61-1 is changed to low (OFF), and accordingly, the switching transistor 62-1 is turned off.

Subsequently, thereafter, operation is repeated wherein the shift register 61 on the next line turns on the corresponding switching transistor 62 for each elapse of duration

*T*=display duration of one frame/number of scan lines.

and of the shift registers emitting light, the shift register 61 on the top turns off the corresponding switching transistor 62.

That is to say, the ON duration of each switching transistor 62, in other words, the emission duration of the emission elements 21 on each line becomes 3T. Also, timing wherein each switching transistor 62 is turned on, in other words, the emission start point-in-time of each of the emission elements 21 on each line is shifted by T.

Figure 8:
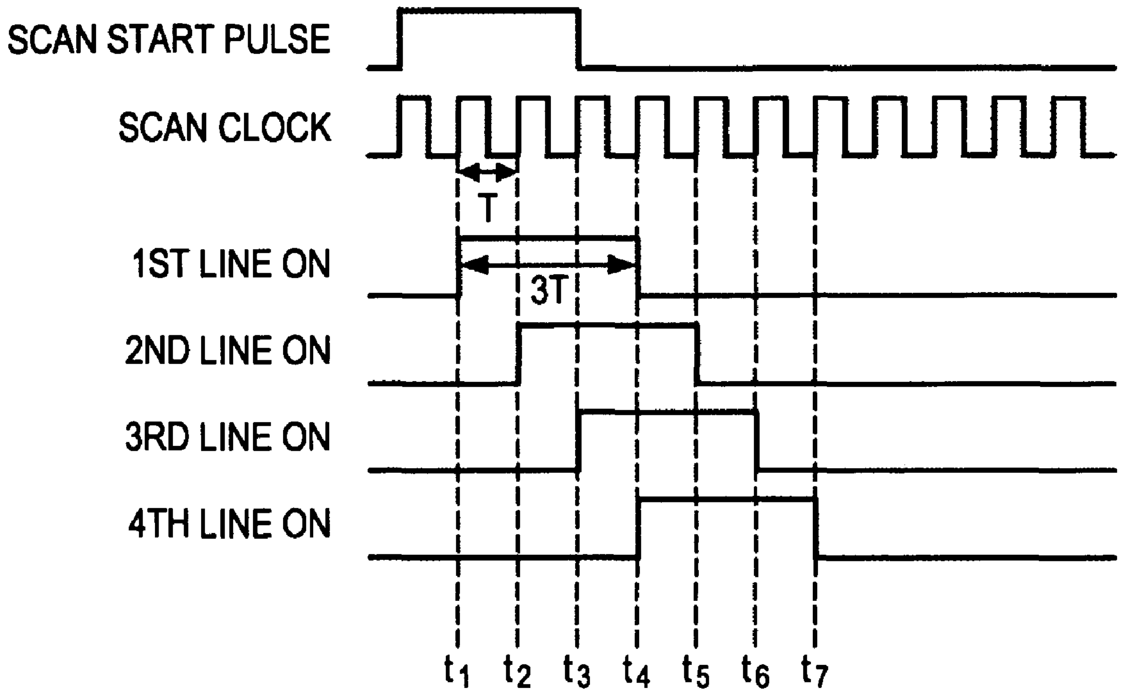
FIG. 8 is a diagram for describing the scan timing of the display device shown in FIG. 6.

The emission timing of each line in the case of the shift register 61 being thus turned on/off is shown in FIG. 8.

As shown in FIG. 8, after the scan start pulse is generated, emission of the first line is started at point-in-time $t_1$ based on the timing controlled with the scan clock, and at this time, the image data signal corresponding to each pixel on the first line is output from the #1 data driver 123. Subsequently, the emission of the second line is started at point-in-time $t_2$, and at this time, the image data signal corresponding to each pixel of the second line is output from the #2 data driver 124. Subsequently, the emission of the third line is started at point-in-time $t_3$, and at this time, the image data signal corresponding to each pixel of the third line is output from the #3 data driver 125. Subsequently, the emission of the fourth line is started at point-in-time $t_4$, and at this time, the image data signal corresponding to each pixel of the fourth line is output from the #1 data driver 123.

Subsequently, the emission of the unshown fifth line is started at point-in-time $t_5$, and also the emission of the second line ends, the output of the image data corresponding to each pixel of the fifth line is started from the #2 data driver 124, and thereafter, similarly, after elapse of the duration T from the emission start of each line, the emission of the next line is started, after elapse of duration 3T from the emission start of each line, the emission of the line thereof ends, and the emission of the next line is started. Thus, the ON signal corresponding to the scan start pulse is shifted to the shift registers 61-3 through 61-*c*.

Figure 3:
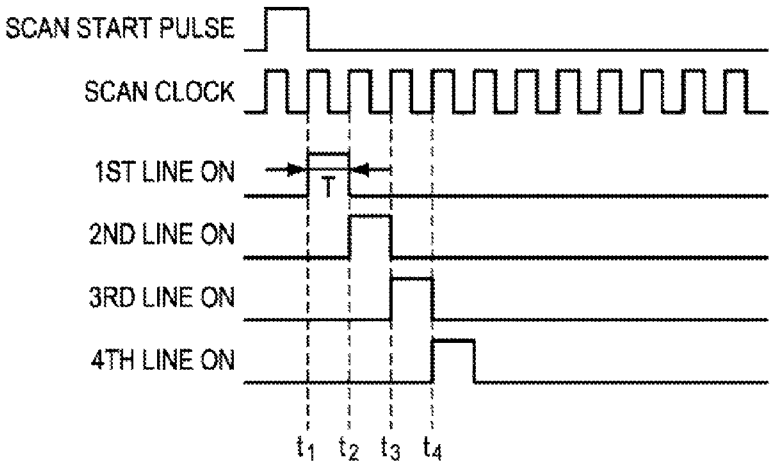
FIG. 3 is a diagram for describing the scan timing of the display device shown in FIG. 1.
Figure 4:
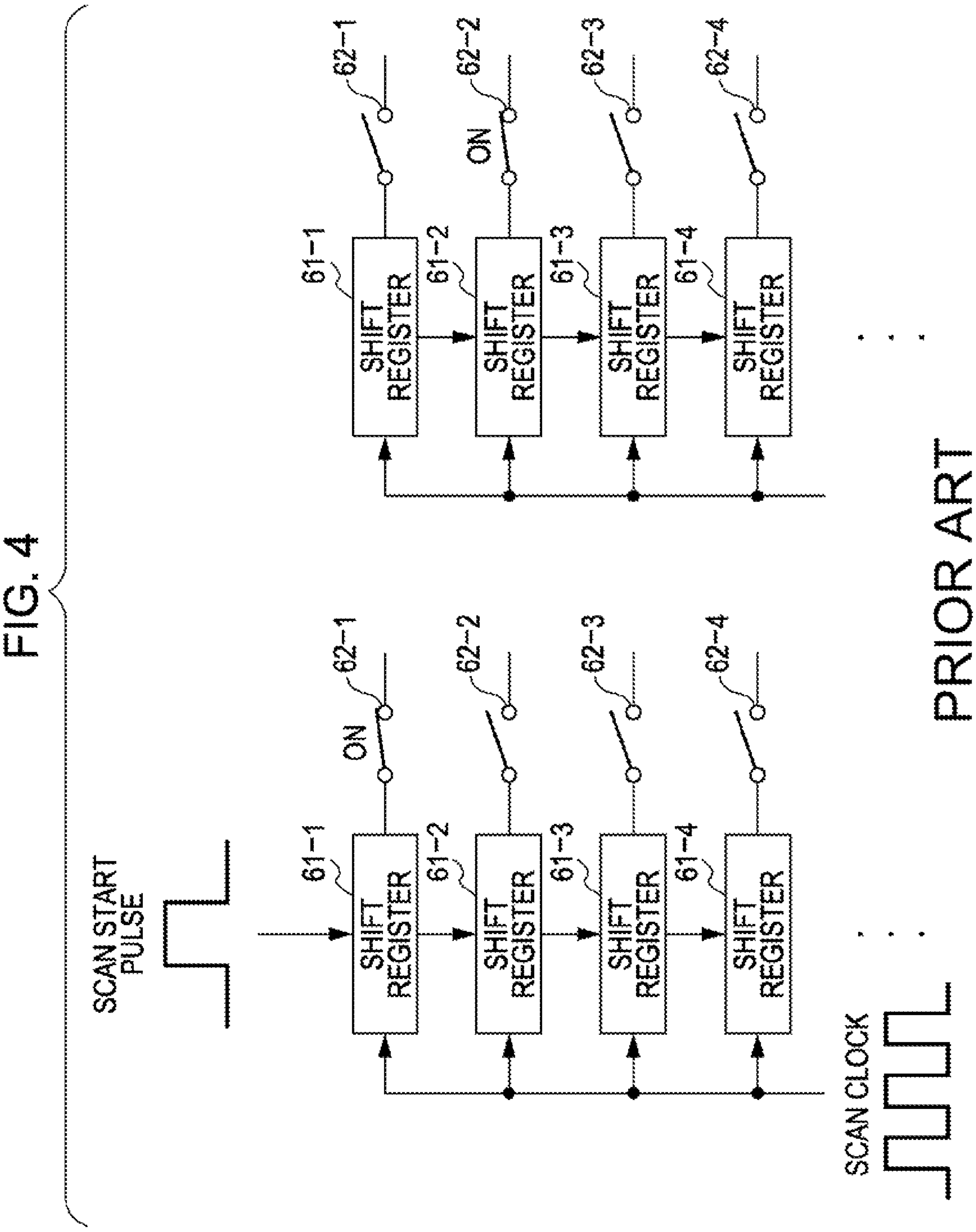
FIG. 4 is a diagram for describing the operation of the scan driver shown in FIG. 1.
Figure 5:
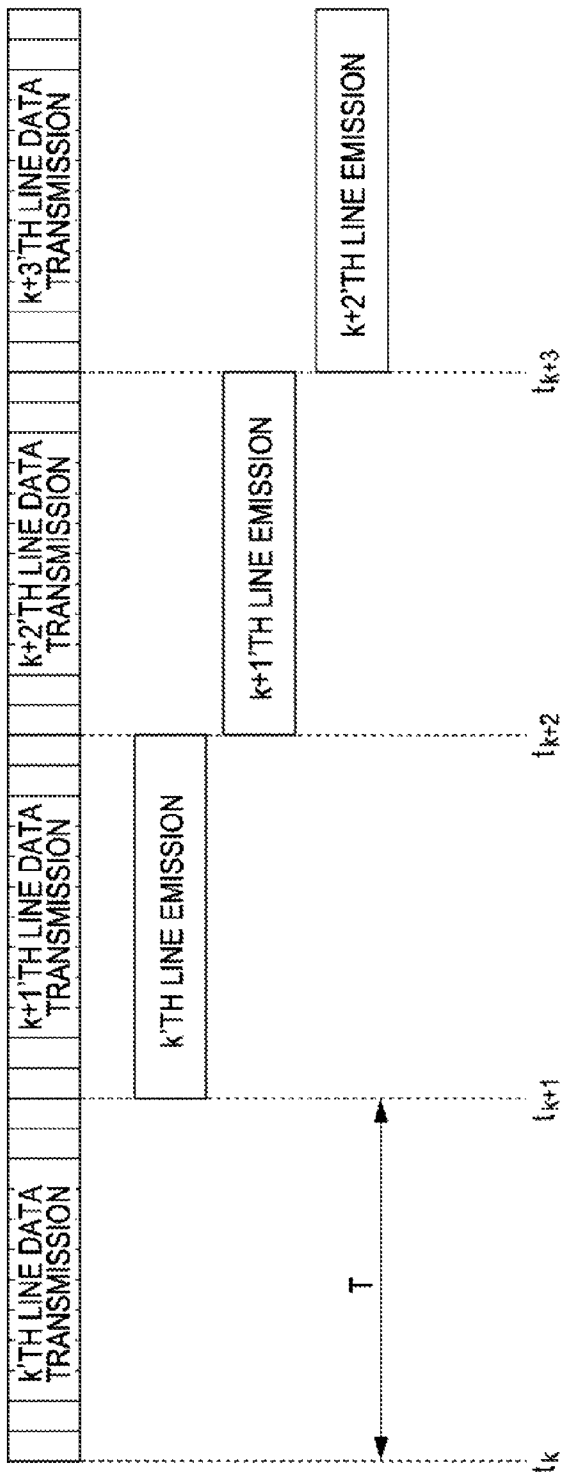
FIG. 5 is a diagram for describing data transmission and emission timing for each line of the display device shown in FIG. 1.

Thus, with the display device 101, three consecutive lines are lit constantly at a time, the emission start timing of each line is arranged to be shifted by display duration of one frame/number of scan lines, so the response time for displaying one frame is similar to that in the related art described with reference to FIG. 3, but when assuming that display duration of one frame/number of scan lines in the related case described with reference to FIG. 3 is the duration T, the one-time emission duration of each line is triple the duration T, i.e., 3T. Accordingly, the brightness of each pixel increases by the worth wherein the emission duration is prolonged as compared to a case wherein the emission duration of one line is T.

Figure 9:
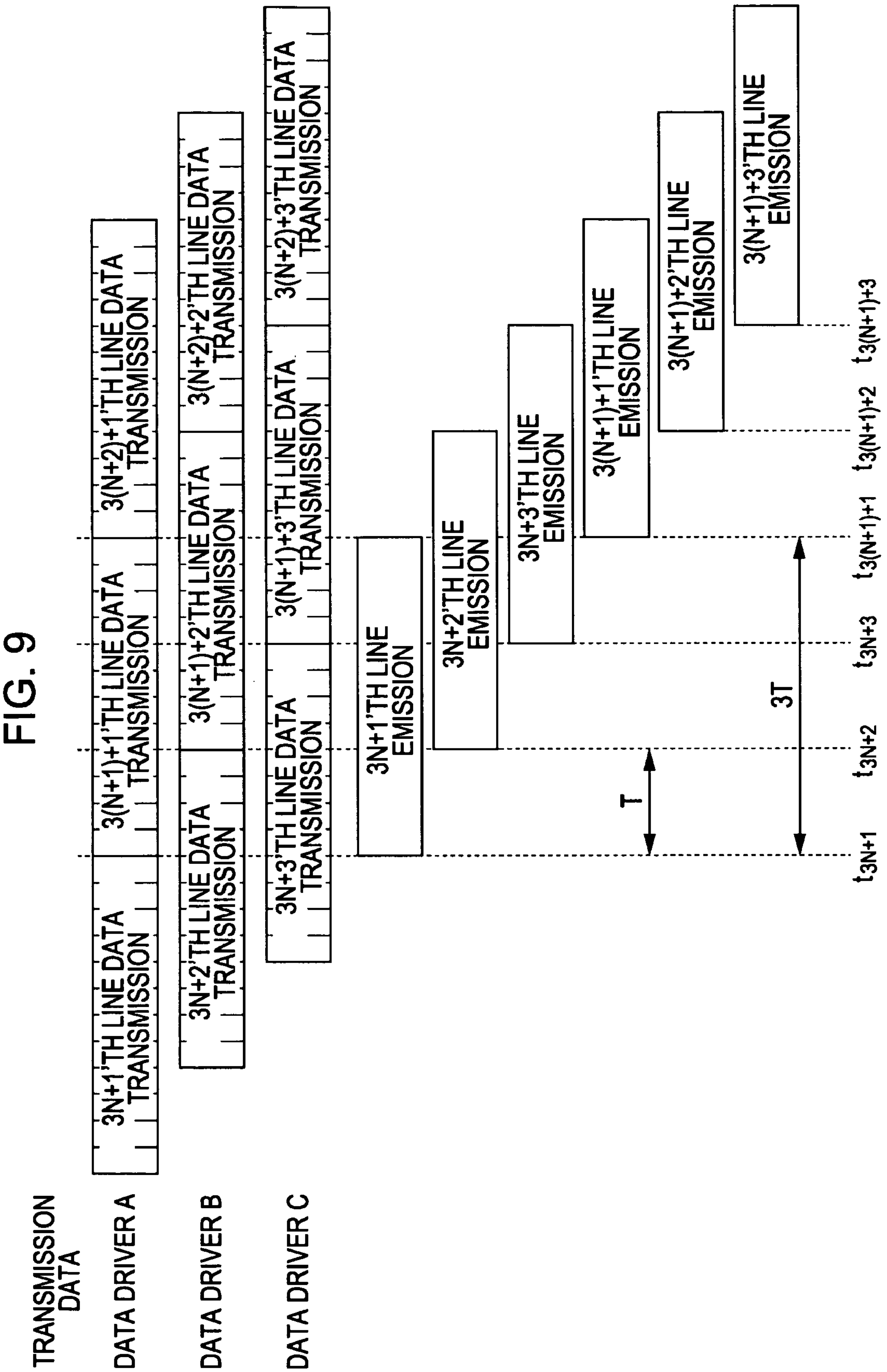
FIG. 9 is a diagram for describing data transmission and emission timing for each line of the display device shown in FIG. 6.

Description will be made with reference to FIG. 9 regarding data transmission from the controller 121 to the #1 data driver 123, #2 data driver 124, or #3 data driver 125, and the emission timing of each line.

The image data signal of the 3N+1'th line (where N is an integer; $0 \leqq N \leqq \{(\text{number of scan lines}-1)/3\}$) is supplied from the controller 121 to the #1 data driver 123. As described above, the lag regarding the emission start point-in-time of each line is $$T=\text{display duration of one frame/number of scan lines},$$

and the emission duration of each line is 3T, and accordingly, the duration necessary for data transmission of one line needs to be within 3T. Subsequently, after elapse of the duration T from the transmission start point-in-time of the image data signal of the 3N+1'th line, the data of the 3N+2'th line which is the next line is supplied from the controller 121 to the #2 data driver 124, and further after elapse of the duration T, and the data of the 3N+3'th line which is the next line is supplied from the controller 121 to the #3 data driver 125.

Subsequently, at point-in-time $t_{3N+1}$ after elapse of the duration 3T from the transmission start point-in-time of the image data signal of the 3N+1'th line, the 3N+1'th line is lit, and supply of the image data signal of the 3(N+1)+1'th line to the #1 data driver 123 is started. Subsequently, after elapse of the duration 3T from the transmission start point-in-time of the image data signal of the 3N+2'th line, i.e., at point-in-time $t_{3N+2}$ after elapse of the duration T from the point-in-time $t_{3N+1}$, the 3N+2'th line is lit, and supply of the image data signal of the 3(N+1)+2'th line to the #2 data driver 124 is started. At the point-in-time $t_{3N+2}$, the 3N+1'th line is still being lit.

Subsequently, after elapse of the duration 3T from the transmission start point-in-time of the image data signal of the 3N+3'th line, i.e., at point-in-time $t_{3N+3}$ after elapse of the duration T from the point-in-time $t_{3N+2}$, the 3N+3'th line is lit, and supply of the image data signal of the 3(N+1)+3'th line to the #3 data driver 125 is started. At the point-in-time $t_{3N+3}$, the 3N+1'th line and 3N+2'th line are still being lit. Subsequently, after elapse of the duration 3T from the transmission start point-in-time of the image data signal of the 3(N+1)+1'th line, i.e., at point-in-time $t_{3(N+1)+1}$ after elapse of the duration T from the point-in-time $t_{3N+3}$, the 3(N+1)+1'th line is lit, and supply of the image data signal of the 3(N+2)+1'th line to the #1 data driver 123 is started. At the point-in-time $t_{3N+2}$, the emission of the 3N+1'th line ends, but the 3N+2'th line and 3N+3'th line are still being lit.

Subsequently, hereafter, similarly, each line is lit such that the emission start point-in-time of each line is shifted by the duration T, and the emission duration of each line becomes 3T, along with the emission start of each line, the transmission of the image data signal corresponding to the line after three lines from the line where the emission has been started is started.

That is to say, the data signal even at any line is supplied from the controller 121 to one of the #1 data driver 123, #2 data driver 124, and #3 data driver 125 at the transmission rate which is a third of that in the related art. The lag of the transmission start timing in a case wherein the data signal of each line is transmitted from the controller 121 is the duration T similar to the related art. On the other hand, each of the #1 data driver 123, #2 data driver 124, and #3 data driver 125 starts reception of the data signal of one line for each duration 3T.

The emission duration of each line is the duration 3T which is triple that in the related art. The lag regarding the emission start point-in-time of consecutive lines is the duration T which is a third of the duration 3T which is the emission duration of each line. That is to say, the lag regarding the emission duration of consecutive lines is the same as that in the related art, so response time for displaying one frame is equal to that in the related art As described above, the display device 101 shown in FIG. 6 includes the three data drivers of the #1 data driver 123, #2 data driver 124, and #3 data driver 125, whereby the emission elements 21 of three lines can be lit simultaneously.

Also, with the display device 101, the emission start timing of each line of the display portion 122 is shifted by T in the same way as that in the related art, i.e., in a case wherein the response time for displaying one frame is in the same way as that in the related art, the emission duration of each line becomes 3T which is triple the duration T. Accordingly, the brightness increases as compared to that in the related art. Therefore, even if LEDs are employed as the emission elements of the display device 101 to which the simple matrix method has been applied, necessary brightness can be obtained without increasing the driving current value of the LEDs. Also, there is no need to increase the driving current value of the LEDs, and accordingly, the life of the LEDs is prolonged.

Also, with the display device 101, even in a case wherein each of the three data drivers of the #1 data driver 123, #2 data driver 124, and #3 data driver can latch only one line worth of image data signals, the duration necessary for data transmission of one line needs to be within 3T. Accordingly, the data transmission rate of the image signal corresponding to one line can be reduced as compared to the related art.

Further, the display device 101 has such a configuration, whereby one PWM cycle of PWM control executed by the #1 data driver 123, #2 data driver 124, and #3 data driver 125 becomes triple. That is to say, the switching frequency of PWM decreases, so the life of switching elements is prolonged, consumption power is reduced, and further, EMI (Electro Magnetic Interference) due to switching cannot be readily effected. Also, the switching frequency of the LEDs employed as the emission elements 21 decreases, whereby the life of the LEDs is prolonged as compared to that in a case wherein the PWM cycle is short.

Also, with the display device 101, the number of data drivers may be two or four or more, and with the display device 101, the emission elements 21 of the same number of lines as the number of provided data drivers can be lit simultaneously.

For example, when assuming that the number of lines to be lit simultaneously is M, M data drivers are provided in parallel. With the display portion of monochrome display, data wiring lines M times as many as the number of pixels arrayed in the horizontal direction are disposed. Also, with the display portion of color display, there are disposed data wiring lines M times as many as further three times as many as the number of pixels arrayed in the vertical and horizontal directions. Note that the number of scan wiring lines in the horizontal direction from the scan driver is the same as the number of horizontal lines making up one frame, and is not changed. The scan start pulse supplied from the controller to the scan driver is assumed to have pulse width M times the pulse width of the scan clock. Thus, one line worth of the emission elements are lit consecutively during duration M×T, the emission start point-in-time of consecutive lines is shifted by the duration T, and accordingly, the M lines are simultaneously lit at a time.

Figures 10, 10A:
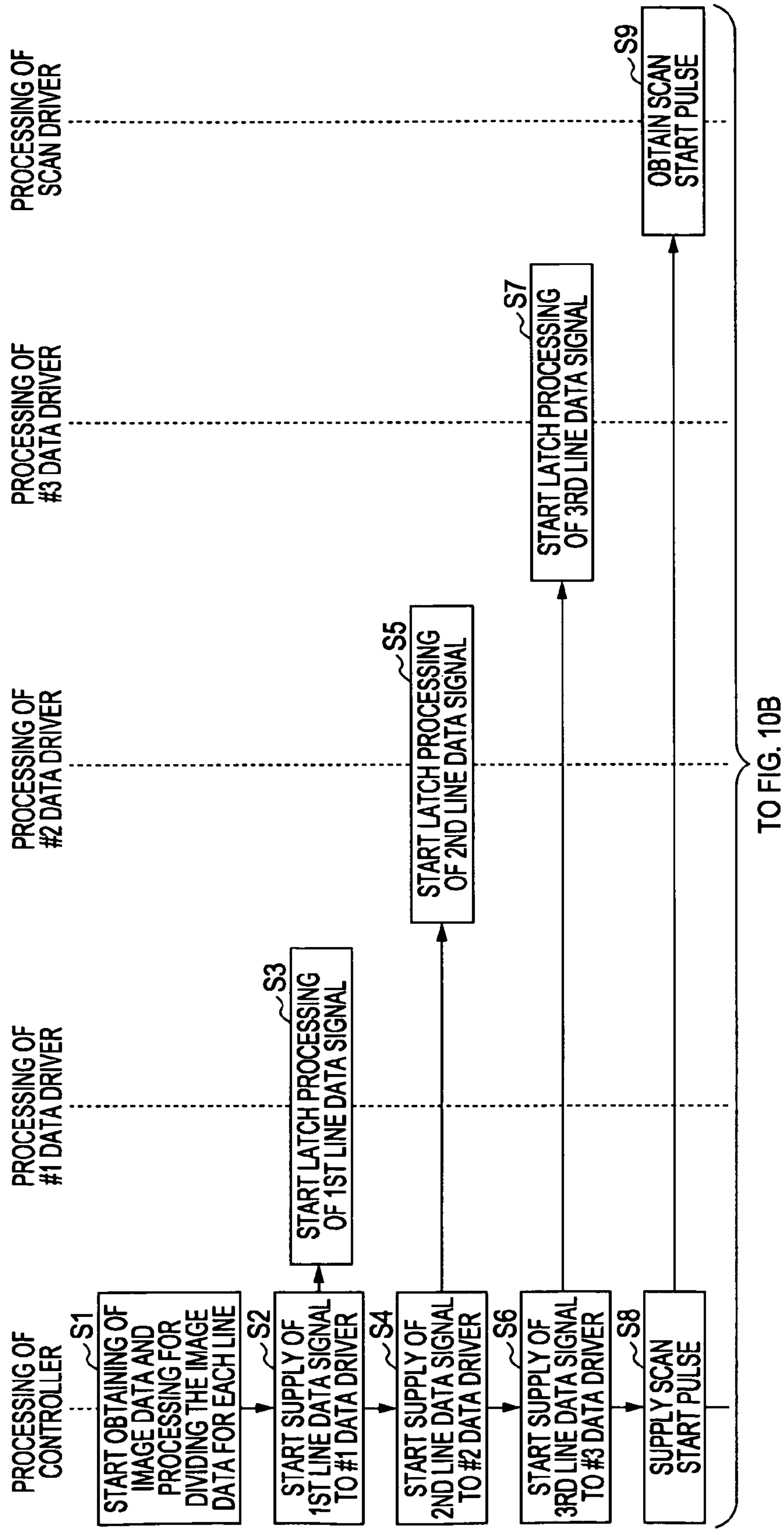
FIG. 10 is a flowchart for describing the processing of the display device shown in FIG. 6.
Figure 10B:
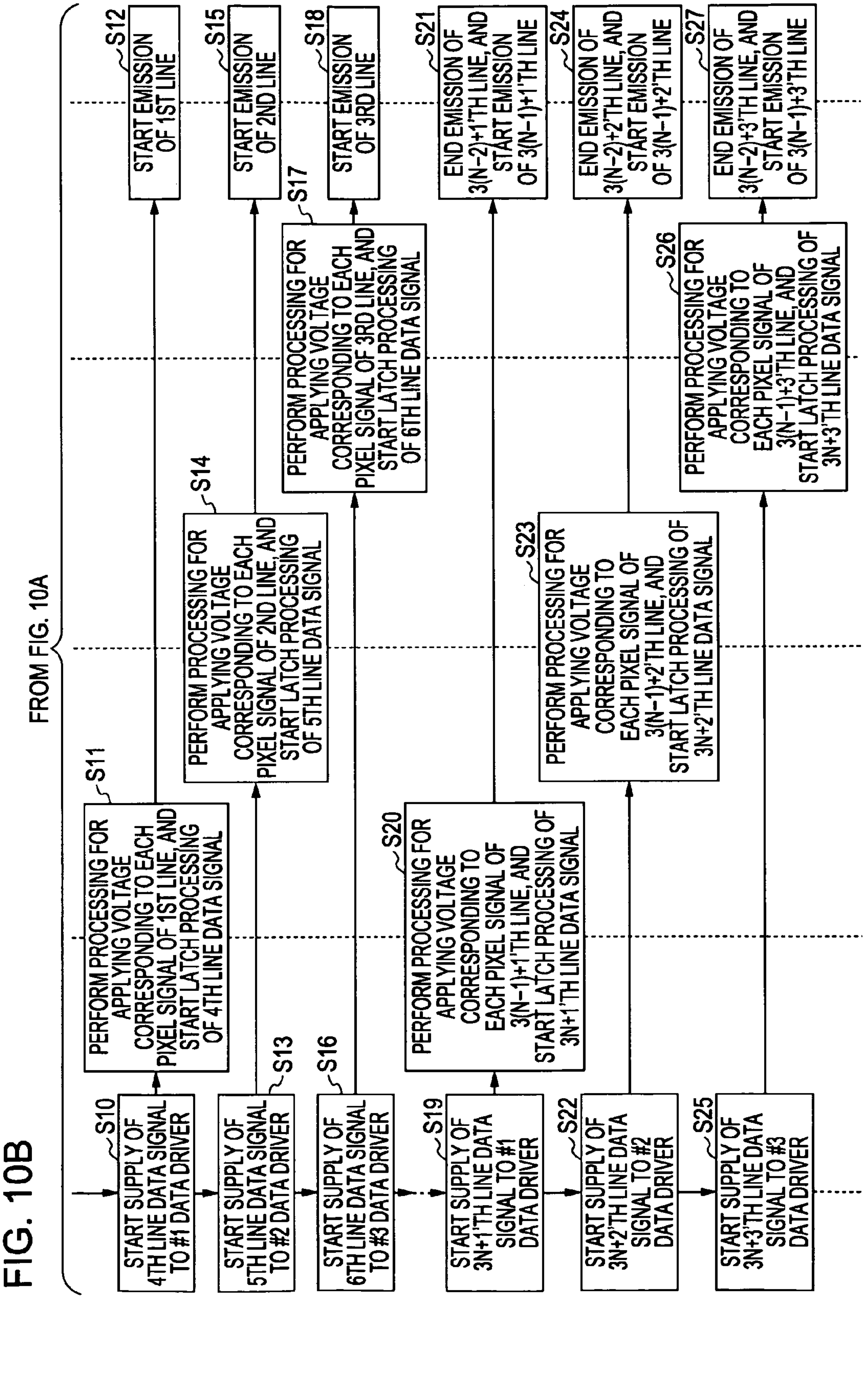

Next, description still be made with reference to the flowchart shown in FIG. 10 regarding processing which each of the controller 121, #1 data driver 123, #2 data driver 124, #3 data driver 125, and scan driver 126 executes when displaying one frame worth of image on the display portion 122, and the relation between those.

In step S1, the controller 121 starts obtaining of image data to be displayed on the display portion 122, and starts processing for dividing the obtained image data for each line.

In step S2, the controller 121 starts supply of the data signals of the first line to the #1 data driver 123.

In step S3, the #1 data driver 123 starts latch processing of the data signals of the first line of which the supply from the controller 121 has been started in parallel with the processing of the controller 121 in step S2.

In step S4, the controller 121 starts supply of the data signals of the second line to the #2 data driver 124.

In step S5, the #2 data driver 124 starts latch processing of the data signals of the second line of which the supply from the controller 121 has been started in parallel with the processing of the controller 121 in step S4.

In step S6, the controller 121 starts supply of the data signals of the third line to the #3 data driver 125.

In step S7, the #3 data driver 125 starts latch processing of the data signals of the third line of which the supply from the controller 121 has been started in parallel with the processing of the controller 121 in step S6.

In step S8, the controller 121 supplies the scan start pulse to the scan driver 126.

In step S9, the scan driver 126 obtains the scan start pulse generated at the controller 121.

After completion of supply of the data signals of the first line, in step S10 the controller 121 starts supply of the data signals of the fourth line to the #1 data driver 123.

In step S11, the #1 data driver 123 performs processing for applying voltage corresponding to each pixel signal of the first line subjected to the latch processing in step S3, and starts latch processing of the data signals of the fourth line of which the supply from the controller 121 has been started in parallel with the processing of the controller 121 in step S10.

In step S12, the scan driver 126 turns on the switching transistor 62-1 to start the emission of the first line simultaneously with the processing for applying voltage corresponding to each pixel signal of the first line by the #1 data driver 123. Thus, the first line of the image is displayed on the display portion 122.

After completion of supply of the data signals of the second line, in step S13 the controller 121 starts supply of the data signals of the fifth line to the #2 data driver 124.

In step S14, the #2 data driver 124 performs processing for applying voltage corresponding to each pixel signal of the second line subjected to the latch processing in step S5, and starts latch processing of the data signals of the fifth line of which the supply from the controller 121 has been started in parallel with the processing of the controller 121 in step S13.

In step S15, the scan driver 126 turns on the switching transistor 62-2 to start the emission of the second line simultaneously with the processing for applying voltage corresponding to each pixel signal of the second line by the #2 data driver 124. Consequently, the first and second lines of the image are displayed on the display portion 122.

After completion of supply of the data signals of the third line, in step S16 the controller 121 starts supply of the data signals of the sixth line to the #3 data driver 125.

In step S17, the #3 data driver 125 performs processing for applying voltage corresponding to each pixel signal of the third line subjected to the latch processing in step S7, and starts latch processing of the data signals of the sixth line of which the supply from the controller 121 has been started in parallel with the processing of the controller 121 in step S16.

In step S18, the scan driver 126 turns on the switching transistor 62-3 to start the emission of the third line simultaneously with the processing for applying voltage corresponding to each pixel signal of the third line by the #3 data driver 125. Consequently, the first through third lines of the image are displayed on the display portion 122.

Subsequently, hereafter, the following processing in steps S19 through S27 is repeatedly executed until display of one frame ends, where N is a positive integer, and N=2, 3, 4, and so on. Note that processing in the case of N=0 corresponds to the processing in steps S2 through S7, and processing in the case of N=1 corresponds to the processing in steps S10 through S18.

In step S19, the controller 121 starts supply of the data signals of the 3N+1'th line to the #1 data driver 123.

In step S20, the #1 data driver 123 performs processing for applying voltage corresponding to each pixel signal of the 3(N−1)+1'th line of which the latch processing has been executed immediately before, and also starts latch processing of the data signals of the 3N+1'th line of which the supply has been started from the controller 121 in parallel with the processing of the controller 121 in step S19.

In step S21, the scan driver 126 ends the emission of the 3(N−2)+1'th line simultaneously with the processing for applying voltage corresponding to each pixel signal of the 3(N−1)+1'th line by the #1 data driver 123, and starts the emission of the 3(N−1)+1'th line. Thus, the 3(N−1)+1'th line of the image is displayed on the display portion 122. At this time, the 3(N−2)+2'th line and 3(N−2)+3'th line have also been displayed.

In step S22, the controller 121 starts supply of the data signals of the 3N+2'th line to the #2 data driver 124.

In step S23, the #2 data driver 124 performs processing for applying voltage corresponding to each pixel signal of the 3(N−1)+2'th line of which the latch processing has been executed immediately before, and also starts latch processing of the data signals of the 3N+2'th line of which the supply has been started from the controller 121 in parallel with the processing of the controller 121 in step S22.

In step S24, the scan driver 126 ends the emission of the 3(N−2)+2'th line simultaneously with the processing for applying voltage corresponding to each pixel signal of the 3(N−1)+2'th line by the #2 data driver 124, and starts the emission of the 3(N−1)+2'th line. Thus, the 3(N−1)+2'th line of the image is displayed on the display portion 122. At this time, the 3(N−2)+3'th line and 3(N−2)+1'th line have also been displayed.

In step S25, the controller 121 starts supply of the data signals of the 3N+3'th line to the #3 data driver 125.

In step S26, the #3 data driver 125 performs processing for applying voltage corresponding to each pixel signal of the 3(N−1)+3'th line of which the latch processing has been executed immediately before, and also starts latch processing of the data signals of the 3N+3'th line of which the supply has been started from the controller 121 in parallel with the processing of the controller 121 in step S25.

In step S27, the scan driver 126 ends the emission of the 3(N−2)+3'th line simultaneously with the processing for applying voltage corresponding to each pixel signal of the 3(N−1)+3'th line by the #3 data driver 125, and starts the emission of the 3(N−1)+3'th line. Thus, the 3(N−1)+3'th line of the image is displayed on the display portion 122. At this time, the 3(N−1)+1'th line and 3(N−1)+2'th line have also been displayed.

Subsequently, the processing in steps S19 through S27 is repeated until display of one frame ends, and the above-mentioned processing is repeated until the display processing of the image ends.

According to such processing, consecutive three lines are lit while shifting the emission start timing, and the emission duration of each line is prolonged as compared to that in the related art, so the brightness of the display portion 122 is enhanced without increasing the driving current value of the LEDs employed as the emission elements 21. Also, one PWM cycle of PWM control for adjusting the brightness of each emission element is prolonged, whereby the life of the LEDs employed as the emission elements 21 is prolonged, and EMI (Electro Magnetic Interference) is not readily effected.

Figure 11:
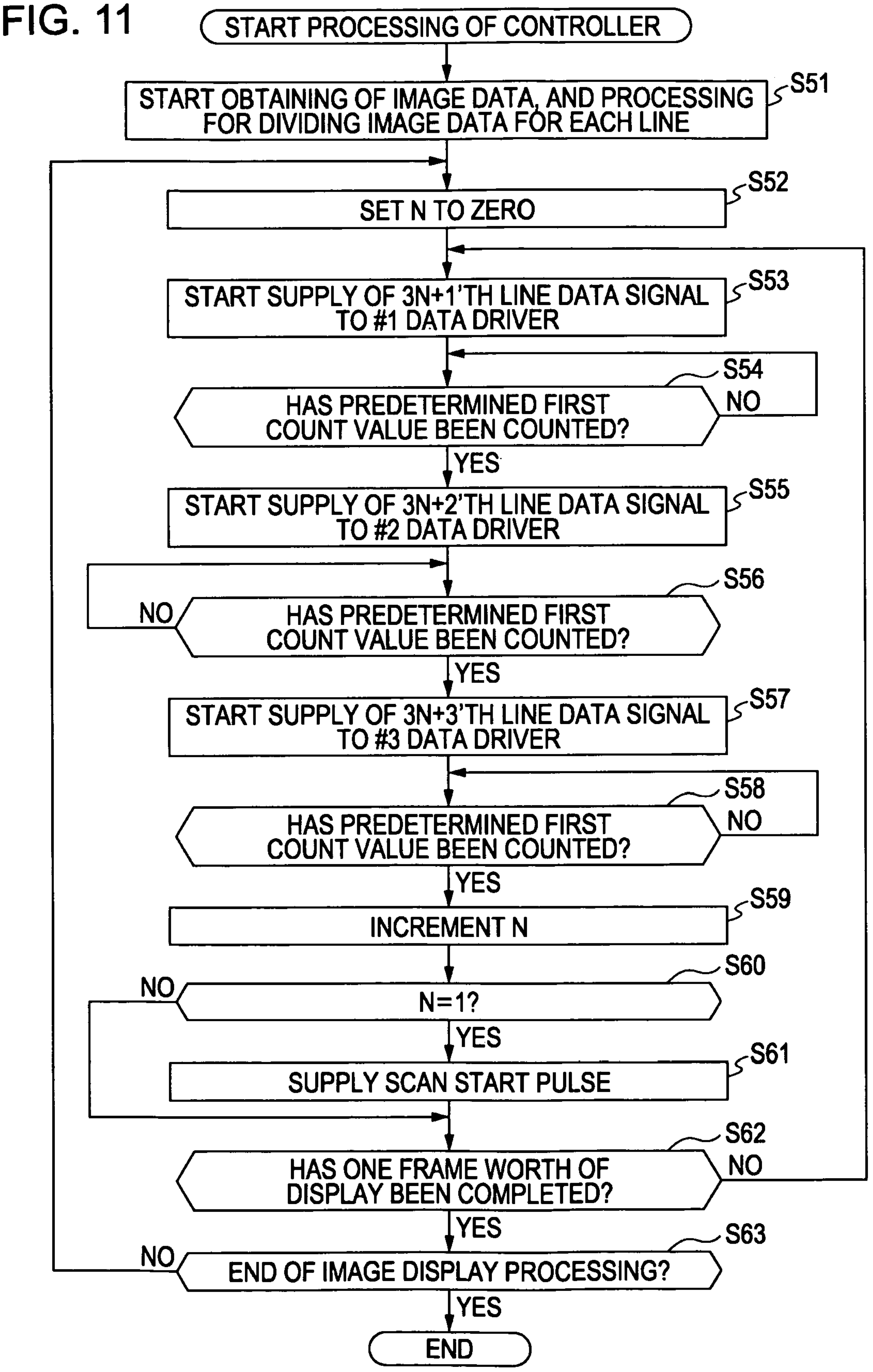
FIG. 11 is a flowchart for describing the processing of a controller.

Next, description will be made regarding the processing of the controller 121 with reference to the flowchart shown in FIG. 11.

In step S51, the controller 121 starts obtaining of image data, and processing for dividing the image data for each line.

In step S52, the controller 121 initializes a value N indicating which line of one frame the data being processed is to set N=0.

In step S53, the controller 121 starts supply of the data signals of the 3N+1'th line to the #1 data driver 123.

IN step S54, the controller 121 determines whether or not display duration of one frame/number of scan lines=duration $T$ which is a predetermined first count value has been counted since supply of the data signals to the #1 data driver 123 was started in step S53. In a case wherein determination is made in step S54 that the first count value has not been counted, the processing in step S54 is repeated until determination is made that the first count value has been counted.

In a case wherein determination is made in step S54 that the first count value has been counted, in step S55 the controller 121 starts supply of the data signals of the 3N+2'th line to the #2 data driver 124.

In step S56, the controller 121 determines whether or not the duration T which is the predetermined first count value has been counted since supply of the data signals to the #2 data driver 124 was started in step S55. In a case wherein determination is made in step S56 that the first count value has not been counted, the processing in step S56 is repeated until determination is made that the first count value has been counted.

In a case wherein determination is made in step S56 that the first count value has been counted, in step S57 the controller 121 starts supply of the data signals of the 3N+3'th line to the #3 data driver 125.

In step S58, the controller 121 determines whether or not the duration T which is the predetermined first count value has been counted since supply of the data signals to the #3 data driver 125 was started in step S57. In a case wherein determination is made in step S58 that the first count value has not been counted, the processing in step S58 is repeated until determination is made that the first count value has been counted.

In a case wherein determination is made in step S58 that the first count value has been counted, in step S59 the controller 121 increments the value N indicating the line corresponding to the data being processed.

In step S60, the controller 121 determines whether or not the value N indicating the line is 1, i.e., N=1.

In a case wherein determination is made in step S60 that N=1, in step S61 the controller 121 supplies the scan start pulse having pulse width triple that of the scan clock to the scan driver 126.

In a case wherein determination is made in step S60 that N≠1, or following the processing in step S61, in step S62 the controller 121 determines whether or not one frame worth of display has been completed. In a case wherein determination is made in step S62 that one frame worth of display has not been completed, the processing returns to step S53, and the subsequent processing is repeated.

In a case wherein determination is made in step S62 that one frame worth of display has been completed, in step S63 the controller 121 determines whether or not the image displays processing has been ended. In a case wherein determination is made in step S63 that the image display processing has not been ended, the processing returns to step S52, where the subsequent processing is repeated. In a case wherein determination is made in step S63 the image display processing has been ended, the processing ends.

According to such processing, the data is supplied to the multiple data drivers (#1 data driver 123, #2 data driver 124, and #3 data driver 125) one line at a time within the duration 3T. That is to say, each data transfer rate can be suppressed to a third that in the related art. Also, the scan start pulse having pulse width triple the scan clock is supplied to the scan driver 126.

Next, description will be made regarding the processing of the scan driver 126 with reference to the flowchart shown in FIG. 12.

In step S91, the scan driver 126 obtains the scan start pulse having pulse width triple the scan clock from the controller 121. This scan start pulse is the pulse which the controller 121 supplied to the scan driver 126 in the processing in step S61 of the controller 121 described with reference to FIG. 11.

In step S92, the scan driver 126 initializes a value N indicating which line of one frame the data being processed is to set N=0.

In step S93, the scan driver 126 ends the emission of the 3(N−1)+1'th line or the 3×α+1'th line where the data of the last line is displayed by the #1 data driver 123 of the previous frame, and starts the emission of the 3N+1'th line. Here, the value of α differs depending on the number of lines making up one frame.

Note that in the case of N=0, the 3(N−1)+1'th line does not exist, so when the frame being displayed is the first frame, the scan driver 126 does not end the emission of any line, but when the frame being displayed is the second frame and thereafter, the scan driver 126 ends the emission of the 3×α+

1'th line of the previous frame. In the case of N≧1, the 3(N−1)+1'th line exists, so the scan driver 126 ends the emission of the 3(N−1)+1'th line of the frame thereof.

In step S94, the scan driver 126 determines whether or not display duration of one frame/number of scan lines=duration $T$ which is a predetermined first count value has been counted since the emission of the 3N+1'th line was started in step S93. In a case wherein determination is made in step S94 that the predetermined first count value has not been counted, the processing in step S94 is repeated until determination is made that the predetermined first count value has been counted.

In a case wherein determination is made in step S94 that the predetermined first count value has been counted, in step S95 the scan driver 126 ends the emission of the 3(N−1)+2'th line or the 3×α+2'th line where the data of the last line is displayed by the #2 data driver 124 of the previous frame, and starts the emission of the 3N+2'th line. Note that in the case of N=0, the 3(N−1)+2'th line does not exist, so when the frame being displayed is the first frame, the scan driver 126 does not end the emission of any line, but when the frame being displaced is the second frame and thereafter, the scan driver 126 ends the emission of the 3×α+2'th line of the previous frame. In the case of N≧1, the 3(N−1)+2'th line exists, so the scan driver 126 ends the emission of the 3(N−1)+2'th line of the frame thereof.

In step S96, the scan driver 126 determines whether or not the duration T which is a predetermined first count value has been counted since the emission of the 3N+2'th line was started in step S95. In a case wherein determination is made in step S96 that the predetermined first count value has not been counted, the processing in step S96 is repeated until determination is made that the predetermined first count value has been counted.

In a case wherein determination is made in step S96 that the predetermined first count value has been counted, in step S97 the scan driver 126 ends the emission of the 3(N−1)+3'th line or the 3×α+3'th line where the data of the last line is displayed by the #3 data driver 125 of the previous frame, and starts the emission of the 3N+3'th line. Note that in the case of N=0, the 3(N−1)+3'th line does not exist, so when the frame being displayed is the first frame, the scan driver 126 does not end the emission of any line, but when the frame being displayed is the second frame and thereafter, the scan driver 126 ends the emission of the 3×α+3'th line of the previous frame. In the case of N≧1, the 3(N−1)+3'th line exists, so the scan driver 126 ends the emission of the 3(N−1)+3'th line of the frame thereof.

In step S98, the scan driver 126 determines whether or not the duration T which is a predetermined first count value has been counted since the emission of the 3N+3'th line was started in step S97. In a case wherein determination is made in step S98 that the predetermined first count value has not been counted, the processing in step S98 is repeated until determination is made that the predetermined first count value has been counted.

In a case wherein determination is made in step S98 that the predetermined first count value has been counted, in step S99 the scan driver 126 increments the value N indicating the line corresponding to the data being processed.

In step S100, the scan driver 126 determines whether or not one frame worth of display has been ended. In a case wherein determination is made in step S100 that one frame worth of display has not been ended, the processing returns to step S93, where the subsequent processing is repeated.

In a case wherein determination is made in step S100 that one frame worth of display has been ended, in step S101 the scan driver 126 determines whether or not the image display processing has been ended. In a case wherein determination is made in step S101 that the image display processing has not been ended, the processing returns to step S92, where the subsequent processing is repeated. In a case wherein determination is made in step S101 the image display processing has been ended, the processing ends.

According to such processing, three consecutive lines are lit while shifting the emission start timing by the duration T, and the emission duration of each line is prolonged triple that in the related art, so even if LEDs are employed as the emission elements of the display device 101 to which the simple matrix method has been applied, necessary brightness can be obtained without increasing the driving current value of the LEDs. Also, there is no need to increase the driving current value of the LEDs, so the life of the LEDs is prolonged. Also, the switching frequency of the LEDs employed as the emission elements 21 decreases, whereby occurrence of EMI (Electro Magnetic Interference) can be suppressed, and accordingly, the life of the LEDs is further prolonged as compared to that in a case wherein the PWM cycle is short.

Next, description will be made regarding the processing of the #1 data driver 123, #2 data driver 124, and #3 data driver 125 with reference to the flowchart shown in FIG. 13. Note here that the processing executed by the #1 data driver 123 will be described as a representative, but the processing of the #2 data driver 124 and #3 data driver 125 is basically the same as the processing by the #1 data driver, and different portions thereof will be described as appropriate.

In step S131, the #1 data driver 123 starts obtaining of one horizontal line worth of the data signal of each pixel, and starts latch processing of one horizontal line worth of data. The data signal of each pixel obtained here is the data signal corresponding to the image of the 3N+1'th line supplied in the processing in step S53 of the processing of the controller 121 described with reference to FIG. 11.

Note that when the data driver executing the processing is the #2 data driver 124, the data signal of each pixel obtained at the processing corresponding to step S131 is the data signal corresponding to the image of the 3N+2'th line supplied in the processing in step S55 of the processing of the controller 121 described with reference to FIG. 11. Also, when the data driver executing the processing is the #3 data driver 125, the data signal of each pixel obtained at the processing corresponding to step S131 is the data signal corresponding to the image of the 3N+3'th line supplied in the processing in step S57 of the processing of the controller 121 described with reference to FIG. 11.

In step S132, the #1 data driver 123 determines whether or not latching of one horizontal line worth of the data signal of each pixel has been completed.

In a case wherein determination is made in step S132 that latching of one horizontal line worth of the data signal of each pixel has not been completed, in step S133 the #1 data driver 123 continues obtaining of the data from the controller 121, and the latch processing of the obtained data. After completion of the processing in step S133, the processing returns to step S132, where the subsequent processing is repeated.

In a case wherein determination is made in step S132 that latching of one horizontal line worth of the data signal of each pixel has been completed, in step S134 the #1 data driver 123 determines whether or not display duration of one frame/number of scan lines×3=duration $3T$ which is a predetermined second count value has been counted since obtaining of one horizontal line worth of data signals was started. In a case wherein determination is made in step S134 that the duration 3T has not been counted, the processing in step S134 is repeated until determination is made that the duration 3T has been counted.

In a case wherein determination is made in step S134 that the duration 3T has been counted, in step S135 the #1 data driver 123 starts processing for applying voltage corresponding to each pixel signal latched. Specifically, the comparator 43 of the #1 data driver 123 controls the duration wherein the driver 44 is ON within a predetermined period (PWM cycle) based on the data signal supplied from the latch 42, thereby controlling the emission period of the corresponding emission element 21.

In step S136, the #1 data driver 123 determines whether or not the image processing has been ended. In a case wherein determination is made in step S136 that the image processing has been ended, the processing ends.

In a case wherein determination is made in step S136 that the image processing has not been ended, in step S137 the #1 data driver 123 starts obtaining of the next one horizontal line worth of the data signal of each pixel in parallel with the processing for applying voltage started in step S135, and also starts latch processing of the next one horizontal line worth of data. Subsequently, the processing returns to step S132, where the subsequent processing is repeated.

According to such processing, one PWM cycle of PWM control for adjusting the brightness of each emission element 21 is prolonged to the duration 3T from the duration T, thereby decreasing the switching frequency of the driver. Accordingly, the consumption power of the #1 data driver 123, #2 data driver 124, and #3 data driver 125 decreases, the life of the emission elements is prolonged, and EMI is not readily effected.

As described above, the display device 101 to which an embodiment has been applied includes the three data drivers of the #1 data driver 123, #2 data driver 124, and #3 data driver 125, whereby the emission elements 21 can light-emit three lines simultaneously.

Also, it goes without saying that the number of data drivers may be a number other than three. For example, in a case wherein the number of lines to be lit simultaneously is M, M data drivers are provided in parallel. Subsequently, data wiring lines M times triple the number of pixels arrayed in the vertical and horizontal directions are disposed on the display portion of monochrome display. Also, data wiring lines M times triple the number of pixels arrayed in the vertical and horizontal directions are disposed on the display portion of color display. Note that the number of scan wiring lines in the horizontal direction from the scan driver is the same as the number of horizontal lines making up one frame, and is unchanged. The scan start pulse supplied from the controller to the scan driver has pulse width M times the scan clock. Thus, the emission elements of one line are lit consecutively during the duration M×T, the emission start point-in-time of consecutive lines is shifted by the duration T, and accordingly, M lines are lit simultaneously at a time.

Also, the emission start timing of each line of the display portion 122 in the case of applying an embodiment is shifted by display duration of one frame/number of scan lines in the same way as the related art, so the response time for displaying one frame is the same as that in the related art. Note however, the emission duration of each line is 3T which is triple the length of that in the related art. Accordingly, as compared to the related art, brightness increases while maintaining the configuration according to the simple matrix method, which can be manufactured inexpensively.

Also, even in a case wherein each of the M data drivers can latch only one line worth of image data signals, in order to emit-light M lines at a time, the duration necessary for data transmission of one line needs to be within 3T. Accordingly, as compared to the related art, the data transmission rate of image signals corresponding to one line can be reduced.

Further, according to such a configuration, one PWM cycle of PWM control executed at the M data drivers becomes M times as to that in the related art. That is to say, the switching frequency of PWM decreases, so the life of the switching elements is prolonged, consumption power is reduced, and further EMI (Electro Magnetic Interference) by unnecessary radiation due to switching cannot readily be effected. Thus, the number of man-hour and number of components necessary for the measures against EMI can be reduced. Also, the switching frequency of LEDs employed as the emission elements 21 decreases, so the life of the LEDs is prolonged as compared to a case wherein the PWM cycle is short.

Also, lines to be lit are M consecutive lines, and control is performed such that the emission start point-in-time of each line is shifted by 1/M of the emission duration of one line. Accordingly, screen flickering and moving image blurring can be suppressed as compared to a case wherein separated multiple lines within a screen are arranged to be lit at a time.

Note that description has been made assuming that LEDs are employed as the emission elements 21 provided in the display portion of the display device 101, but even in a case wherein other elements such as liquid crystal are employed as the emission elements 21, the same configuration is provided, whereby brightness can be enhanced without changing the response rate of display, and occurrence of EMI can be suppressed as compared to a case wherein the PWM cycle is short.

Also, description has been made assuming that the number of lines worth of data drivers to be driven simultaneously are provided in parallel, but it goes without saying that a single data driver for performing the same driving processing as that in the case of employing the multiple data drivers may be connected to all of the data wiring lines.

Also, with the above description, the brightness of the LEDs employed as the emission elements 21 has been driven and controlled using PWM control, but the brightness of the LEDs may be controlled using not only PWM but also current control. Even in a case wherein the brightness of LEDs is controlled by current control, as described above, multiple lines are driven simultaneously, whereby the current value supplied per unit time to obtain the same brightness can be suppressed, and accordingly, the life of the LEDs can be prolonged.

Note that the respective steps according to the present Specification include not only processing performed in time sequence in accordance with the described sequence but also processing not necessarily performed in time sequence but performed in parallel or individually.

Also, with the present Specification, the term "system" represents the entirety of equipment configured of multiple devices.

Note that the embodiments are not restricted to the above-mentioned embodiment, and various modifications can be made without departing from the essence.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device of which the display duration of one frame is X, comprising:

emission means corresponding to each pixel disposed along L lines in a scanning direction;

scanning driving means configured to scan and drive said emission means;

M data signal driving means configured to drive said emission means scanned and driven by said scanning driving means to display a predetermined image, wherein M is an integer satisfying M>1; and control means configured to supply a data signal corresponding to a predetermined image to said M data signal driving means, and control said scanning driving means;

wherein N is assumed to be an integer satisfying $0 \leqq N \leqq L/M-1$, and a is assumed to be an integer satisfying $0<a \leqq M$;

and wherein said control means supply the data signal of the M×N+a'th line to said a'th data signal driving means;

and wherein said scanning driving means scan and drive said emission means such that the M lines of said emission means are driven simultaneously, the difference of driving start point-in-time of each consecutive line becomes X/L, and the consecutive emission duration of the emission means on each line becomes M×X/L.

2. The display device according to claim 1, wherein said control means supply a scan start signal of which the ON time is M×X/L to said scanning driving means;

and wherein said scanning driving means include L shift registers and L switching means, which each correspond to each line of the L lines;

and wherein said shift registers shift said scan start signal from the top line to the bottom line of the L lines per one screen;

and wherein said switching means perform switching of a driving signal so as to scan and drive the corresponding line, when the corresponding shift register of said shift registers holds an ON signal.

3. The display device according to claim 1, wherein said emission means are configured of an LED.

4. The display device according to claim 1, wherein the display device is a passive matrix display.

5. A display method for a display device of which the display duration of one frame is X, said display device including emission means corresponding to each pixel disposed along L lines in a scanning direction, scanning driving means configured to scan and drive said emission means, M data signal driving means configured to drive said emission means scanned and driven by said scanning driving means to display a predetermined image, wherein M is an integer satisfying M>1, and control means configured to supply a data signal corresponding to a predetermined image to said M data signal driving means, and control said scanning driving means, said display method comprising the steps of:

assuming that N is an integer satisfying $0 \leqq N \leqq L/M-1$, and a is an integer satisfying $0<a \leqq M$;

causing said control means to supply the data signal of the M×N+a'th line to said a'th data signal driving means;

causing said scanning driving means to scan and drive said emission means such that the M lines of said emission means are driven simultaneously, the difference of driving start point-in-time of each consecutive line becomes X/L, and the consecutive emission duration of the emission means on each line becomes M×X/L; and causing said M data signal driving means to drive said emission means scanned and driven by said scanning driving means to display a predetermined image.

6. A display device of which the display duration of one frame is X, comprising:

emission elements corresponding to each pixel disposed along L lines in a scanning direction;

a scanning driving unit configured to scan and drive said emission elements;

M data signal driving units configured to drive said emission elements scanned and driven by said scanning driving unit to display a predetermined image, wherein M is an integer satisfying M>1; and a control unit configured to supply a data signal corresponding to a predetermined image to said M data signal driving units, and control said scanning driving unit;

wherein N is assumed to be an integer satisfying $0 \leqq N \leqq L/M-1$, and a is assumed to be an integer satisfying $0<a \leqq M$;

and wherein said control unit supplies the data signal of the M×N+a'th line to said a'th data signal driving unit;

and wherein said scanning driving unit scans and drives said emission elements such that the M lines of said emission elements are driven simultaneously, the difference of driving start point-in-time of each consecutive line becomes X/L, and the consecutive emission duration of the emission elements on each line becomes M×X/L.

7. A display method for a display device of which the display duration of one frame is X, said display device including emission elements corresponding to each pixel disposed along L lines in a scanning direction a scanning driving unit configured to scan and drive said emission elements, M data signal driving units configured to drive said emission elements scanned and driven by said scanning driving unit to display a predetermined image, wherein M is an integer satisfying M>1, and a control unit configured to supply a data signal corresponding to a predetermined image to said M data signal driving units, and control said scanning driving unit, said display method comprising the steps of:

assuming that N is an integer satisfying $0 \leqq N \leqq L/M-1$, and a is an integer satisfying $0<a \leqq M$;

causing said control unit to supply the data signal of the M×N+a'th line to said a'th data signal driving unit;

causing said scanning driving unit to scan and drive said emission elements such that the M lines of said emission elements are driven simultaneously, the difference of driving start point-in-time of each consecutive line becomes X/L, and the consecutive emission duration of the emission elements on each line becomes M×X/L; and causing said M data signal driving units to drive said emission elements scanned and driven by said scanning driving unit to display a predetermined image.

* * * * *